US007134088B2

(12) United States Patent
Larsen

(10) Patent No.: US 7,134,088 B2
(45) Date of Patent: Nov. 7, 2006

(54) METHOD AND SYSTEM FOR PROVIDING TACTICAL INFORMATION DURING CRISIS SITUATIONS

(75) Inventor: Steve Larsen, Crestline, CA (US)

(73) Assignee: Tactical Survey Group, Inc., San Bernardino, CA (US)

( * ) Notice: Subject to any disclaimer, the term of this patent is extended or adjusted under 35 U.S.C. 154(b) by 705 days.

(21) Appl. No.: 10/190,230

(22) Filed: Jul. 3, 2002

(65) Prior Publication Data
US 2003/0058283 A1 Mar. 27, 2003

Related U.S. Application Data

(60) Provisional application No. 60/326,537, filed on Sep. 24, 2001.

(51) Int. Cl.
 G06G 7/00 (2006.01)
 G06F 17/30 (2006.01)
 G06F 17/00 (2006.01)
(52) U.S. Cl. .................. 715/765; 715/713; 715/714
(58) Field of Classification Search .................. 725/33; 705/1; 379/45; 701/201, 209, 211, 200, 701/202, 208, 213; 709/203, 201, 217
 See application file for complete search history.

(56) References Cited

U.S. PATENT DOCUMENTS

| 4,875,034 | A | 10/1989 | Brokenshire | 340/721 |
|---|---|---|---|---|
| 4,962,473 | A | 10/1990 | Crain | 364/900 |
| 5,295,244 | A | 3/1994 | Dev et al. | 395/161 |
| 5,297,252 | A | 3/1994 | Becker | 395/160 |
| 5,310,349 | A | 5/1994 | Daniels et al. | 434/350 |
| 5,347,628 | A | 9/1994 | Brewer et al. | 395/159 |
| 5,448,696 | A | 9/1995 | Shimada et al. | 395/161 |
| 5,504,853 | A | 4/1996 | Schuur et al. | 395/160 |
| 5,671,381 | A | 9/1997 | Strasnick et al. | 395/355 |
| 5,734,805 | A | 3/1998 | Isensee et al. | 395/119 |
| 5,748,109 | A | 5/1998 | Kosaka et al. | 340/995 |
| 5,793,882 | A | 8/1998 | Piatek et al. | 382/115 |
| 5,821,937 | A | 10/1998 | Tonelli et al. | 345/356 |
| 5,896,133 | A | 4/1999 | Lynch et al. | 345/357 |
| 5,940,089 | A | 8/1999 | Dilliplane et al. | 345/515 |
| 5,971,580 | A | * | 10/1999 | Hall et al. | 700/83 |
| 5,977,872 | A | 11/1999 | Guertin | 340/515 |
| 5,995,106 | A | 11/1999 | Naughton et al. | 345/357 |
| 6,002,853 | A | 12/1999 | De Hond | 395/200.49 |
| 6,006,161 | A | 12/1999 | Katou | 701/212 |
| 6,008,808 | A | 12/1999 | Almeida et al. | 345/339 |
| 6,037,936 | A | 3/2000 | Ellenby et al. | 345/339 |
| 6,041,281 | A | 3/2000 | Nimura et al. | 701/211 |
| 6,061,688 | A | 5/2000 | Kilpatrick et al. | 707/102 |
| 6,091,417 | A | 7/2000 | Lefkowitz | 345/357 |

(Continued)

OTHER PUBLICATIONS

Pierce Responder System, as documented by: The Pierce Responder System ESIG Award Winner 2000 from URISA.*

(Continued)

Primary Examiner—Weilun Lo
Assistant Examiner—Jordany Nunez
(74) Attorney, Agent, or Firm—Morrison & Foerster LLP

(57) ABSTRACT

A computer-based method and system for storing and retrieving tactical information pertaining to a site during crisis situations. The method and system provides a graphical user interface comprising a computer screen display and a selection device wherein a user may select from a plurality of options to receive desired tactical information pertaining to a particular site in a plurality of different data formats (e.g., text, graphic images, video, etc.).

39 Claims, 27 Drawing Sheets

U.S. PATENT DOCUMENTS

| | | | |
|---|---|---|---|
| 6,097,389 A | 8/2000 | Morris et al. | 345/346 |
| 6,097,393 A | 8/2000 | Prouty, IV et al. | 345/419 |
| 6,121,966 A | 9/2000 | Teodosio et al. | 345/346 |
| 6,121,969 A | 9/2000 | Jain et al. | 345/355 |
| 6,141,014 A | 10/2000 | Endo et al. | 345/427 |
| 6,144,920 A | 11/2000 | Mikame | 701/212 |
| 6,151,024 A | 11/2000 | Alimpich et al. | 345/357 |
| 6,167,394 A * | 12/2000 | Leung et al. | 707/3 |
| 6,169,552 B1 | 1/2001 | Endo et al. | 345/427 |
| 6,192,266 B1 | 2/2001 | Dupree et al. | 600/427 |
| 6,195,122 B1 | 2/2001 | Vincent | 348/169 |
| 6,201,544 B1 | 3/2001 | Ezaki | 345/425 |
| 6,222,557 B1 | 4/2001 | Pulley, IV et al. | 345/433 |
| 6,232,977 B1 | 5/2001 | Chen | 345/425 |
| 6,247,020 B1 | 6/2001 | Minard | 707/104 |
| 6,271,842 B1 | 8/2001 | Bardon et al. | 345/355 |
| 6,321,158 B1 * | 11/2001 | DeLorme et al. | 701/201 |
| 6,563,529 B1 * | 5/2003 | Jongerius | 348/36 |
| 6,604,126 B1 * | 8/2003 | Neiman et al. | 709/203 |
| 6,748,400 B1 * | 6/2004 | Quick | 707/104.1 |
| 6,873,256 B1 * | 3/2005 | Lemelson et al. | 340/539.1 |
| 6,917,288 B1 * | 7/2005 | Kimmel et al. | 340/511 |
| 7,035,864 B1 * | 4/2006 | Ferrari et al. | 707/102 |
| 2002/0059246 A1 * | 5/2002 | Rowe et al. | 707/10 |
| 2004/0103431 A1 * | 5/2004 | Davenport et al. | 725/33 |

OTHER PUBLICATIONS

Pierce Responder System, as documented by: Grams, Scott, "URISA Unveils New Initative," Aug. 2000, URISA, http://www.urisa.org/NEWS/2000/news2000newsjulyaugust.htm.*

Pierce Responder System, as documented in the article: "Pierce responder System Overview," Mar. 9, 2000.*

* cited by examiner

| File | Edit | View | Favorites | Tools | Help |

Address: D:/grandview elementary demo.htm

169 →

Administrative - On Campus Personnel
*Scroll down for District Personnel*

Principal
Lonnie Urbina
(909) 336-3420 - office
(909) 336-7459 - home
ETA from home - 10 minutes Vice-Principal
Mrs. Ashley
(909) 336-3420 - office
(909) - home Nurse
Sharon Smith
(909) 336-3420 - office
(909) 338-4262 - home
ETA from home - 15 minutes Head Secretary
Nancy Scopen
(909) 336-3420 - office
(909) 337-7008 - home
ETA from home - 15 minutes Switch Board
Mary Burdick
(909) 336-3420 - office
(909) 336-5061 - home
ETA from home - 10 minutes

Administrative - District Personnel

Superintendent
John Aycock
(909) 336-4105 - office
(909) 336-5807 - home
ETA from home - 15 minutes Assistant Superintendent
Paul Loesch
(909) 336-4110 - office
(909) 337-5773 - home
ETA from home - 15 minutes Security
Bill Gibson
(909) 336-0316 - office
(909) 338-2472 - home
ETA from home - 20 minutes Custodial
Roy Kristensen
(909) 336-0344 - office
(909) 337-4459 - home
ETA from home - 10 minutes Maintenance
Roy Kristensen
(909) 336-0344 - office
(909) 337-4459 - home
ETA from home - 10 minutes

FIG. 22

METHOD AND SYSTEM FOR PROVIDING TACTICAL INFORMATION DURING CRISIS SITUATIONS

RELATED APPLICATIONS

The present application claims the benefit of priority under 35 U.S.C. § 119(e) to U.S. Provisional Patent Application Ser. No. 60/326,537 entitled "Method and System for Providing Critical Tactical Information During Crisis Situations," filed on Sep. 24, 2001, the entirety of which is incorporated by reference herein.

BACKGROUND OF THE INVENTION

1. Field of the Invention

The invention relates generally to retrieving tactical information during crisis situations. More particularly, the invention relates to a computer-based method and system for storing and retrieving tactical information to respond to crisis situations.

2. Description of Related Art

Sadly, in recent times, we have become all too familiar with crisis situations such as the Columbine High School shooting incident which left several people dead and many more injured. During that incident, when emergency personnel such as Police, Fire and SWAT personnel responded to the situation, these trained men and women faced many uncertainties that significantly added to the potentially life-threatening risks that they faced—uncertainties which adversely impacted their effectiveness in quickly and safely resolving the situation with minimal risk to civilians and themselves.

For example, during the initial response to the Columbine High School incident when police personnel approached the school premises, they were unaware of the safest, or, more significantly, the most dangerous, route to approach the school buildings and parking lots. For example, they were not aware of which areas were most vulnerable to attack by sniper gun fire while approaching a particular building. They were further unaware of key school personnel to contact, nor did they have access to their contact information. Furthermore, emergency personnel were unaware of building construction and structural information that would have assisted them to strategically plan entry into various building locations. These unknowns, and many others, greatly increased the risk to those individuals responding to the crisis.

As a particular example, when emergency rescue personnel finally entered the buildings, fire alarm sprinklers had flooded the interior rooms, an alarm strobe light was flickering, and an audio alarm was loudly sounding. As a result of these intense stimuli, some of the rescue team members who had prolonged exposure to this environment, suffered from vertigo, which adversely affected their perception and balance. Needless to say, this situation detrimentally affected their effectiveness and posed an otherwise unnecessary risk to these individuals. However, because emergency personnel did not know how to shut off the alarm systems, these strategically undesirable conditions persisted, making an already intensely stressful situation even more difficult.

In light of the exemplary difficulties and problems described above, there is a need for a method and system that can effectively provide critical tactical information to emergency personnel during crisis situations. Because such situations inherently involve high levels of stress and panic, it is desirable that such methods and systems be extremely "user friendly" and allow personnel to quickly and easily obtain a variety of different types of information that may be pertinent to address a particular situation or tactical plan.

SUMMARY OF THE INVENTION

The invention addresses the above and other needs by providing a computer-based method and system for providing critical tactical information to emergency personnel during crisis situations.

In one embodiment of the invention, a system includes a computer (e.g., a personal computer) having a display screen for displaying text, graphic images and video pertaining to critical tactical information requested by a user. In another embodiment, the computer further includes a speaker system to provide audio information to the user. The computer may be a conventional computer known to those skilled in the art and includes, at a minimum, a central processing unit (CPU) for executing program instructions and processing stored data and user inputs, and appropriate memories for storing program instructions, data and user inputs (e.g., a hard drive, ROM, RAM, cache, buffers). In one embodiment, some or all of the program instructions and stored data may be stored on a CD-ROM, wherein the computer includes a CD-ROM drive for reading the CD-ROM and providing instructions and data to the CPU. The computer further includes appropriate input devices (e.g., keyboard, mouse, etc.) for providing user inputs to the computer. Such computers are well-known in the art and need not be further described in detail herein.

In another embodiment, a method of the invention includes displaying at least two interactive windows wherein a first window contains indicia, icons or controls (e.g., html links), which enable a user to retrieve or view information in the second window (e.g., images, video, text). In a preferred embodiment, a first window is capable of displaying, among other things, a structural outline of building or campus walls. By using a "mouse," for example, a user can click on a desired location in the first window to retrieve and view corresponding images or video in the second window.

In a further embodiment, images in the second window include 360-degree spherical images generated using known digital imaging technologies such as iPix™ and IBM Hot Media™ digital imaging, for example. However, it is understood that any other known digital imaging systems and techniques may be used in accordance with the invention. By using 360-degree spherical digital imaging technology, a user can virtually view every aspect of a room on the computer display screen, as if he or she were physically present in the room. In this embodiment, a viewer can "pan" up, down, right or left by dragging a mouse cursor in a desired direction. If the user desires to view the interior of another room, he or she can immediately "jump" to that room by clicking on an appropriate location link or icon in the first screen.

In another embodiment, as the user moves a cursor of a selection device (e.g., a "mouse" device) over certain objects in the room while navigating in the second screen, embedded text will automatically pop up providing critical information about that object. For example, when a mouse cursor pans over a door, a pop-up message may indicate, for example, where the door leads, the material and thickness of the door, which way it opens, and provide the user the option of proceeding through the door. As another example, if the mouse cursor passes over an electrical switch such as a main electrical power shut-off switch, a pop-up message will alert the user to this fact. Pop-up messages can be embedded in a similar fashion for any number of objects that may be of interest in a particular room, e.g., windows, ventilation ducts, ceilings, flooring, closets, electrical and plumbing details, etc.

In another embodiment, a third window is displayed on the computer screen which contains a menu of different types of information which can be displayed in either of the first or second windows, depending on the user's desires. This menu can include items such as geographic or street maps, aerial views, site or campus maps, critical information and telephone numbers, parking lot ingress video, floor diagrams of buildings, etc. In a preferred embodiment, the critical information includes information pertaining to school administrative personnel and their contact information, alarm company information, communications systems information, building construction information, emergency utility shut-off systems, etc.

As explained above, in one embodiment, the computer may execute program instruction and process data stored in a CD-ROM for one or more sites (e.g., Grandview Elementary School). However, it is contemplated that program instructions and data may be stored and retrieved in other desired formats. For example, it is contemplated that program instructions executed by the computer may be stored in the hard drive of the computer, and data to be retrieved and processed by the computer may be stored in a central database that may be accessed by the computer via conventional computer network communications links. Such links would include those utilized in local area networks (LANs), wide area networks (WANs), the global computer network (Internet or world wide web), including wireless communication techniques and protocols known in the art.

BRIEF DESCRIPTION OF THE DRAWINGS

FIG. 1 illustrates an exemplary computer screen display for providing critical information, in accordance with one embodiment of the invention.

FIG. 3 illustrates an exemplary computer screen display after a user has selected a link icon corresponding to a "multi-purpose" room from the "top floor" layout diagram of FIG. 2, in accordance with one embodiment of the invention.

FIG. 4 illustrates an exemplary computer screen display after a user has selected a door inside the multi-purpose room shown in FIG. 3, in accordance with one embodiment of the invention.

FIG. 6 illustrates an exemplary computer screen display showing a hallway just outside of room 101 of FIG. 5 after a user has exited room 101, in accordance with one embodiment of the invention.

FIG. 9 illustrates an exemplary computer screen display after a user has selected an "aerial view" icon from the menu window, in accordance with one embodiment of the invention.

FIG. 10 illustrates an exemplary computer screen display after a user has selected an "aerial animation" icon from the menu window, in accordance with one embodiment of the invention.

FIG. 17 illustrates an exemplary computer screen display after a user has selected an "Administrative Personnel" icon shown in FIG. 16, in accordance with one embodiment of the invention.

FIG. 22 illustrates an exemplary computer screen display after a user has selected an "Electrical Room" icon shown in FIG. 21, in accordance with one embodiment of the invention.

DETAILED DESCRIPTION OF THE PREFERRED EMBODIMENTS

Figure 2:
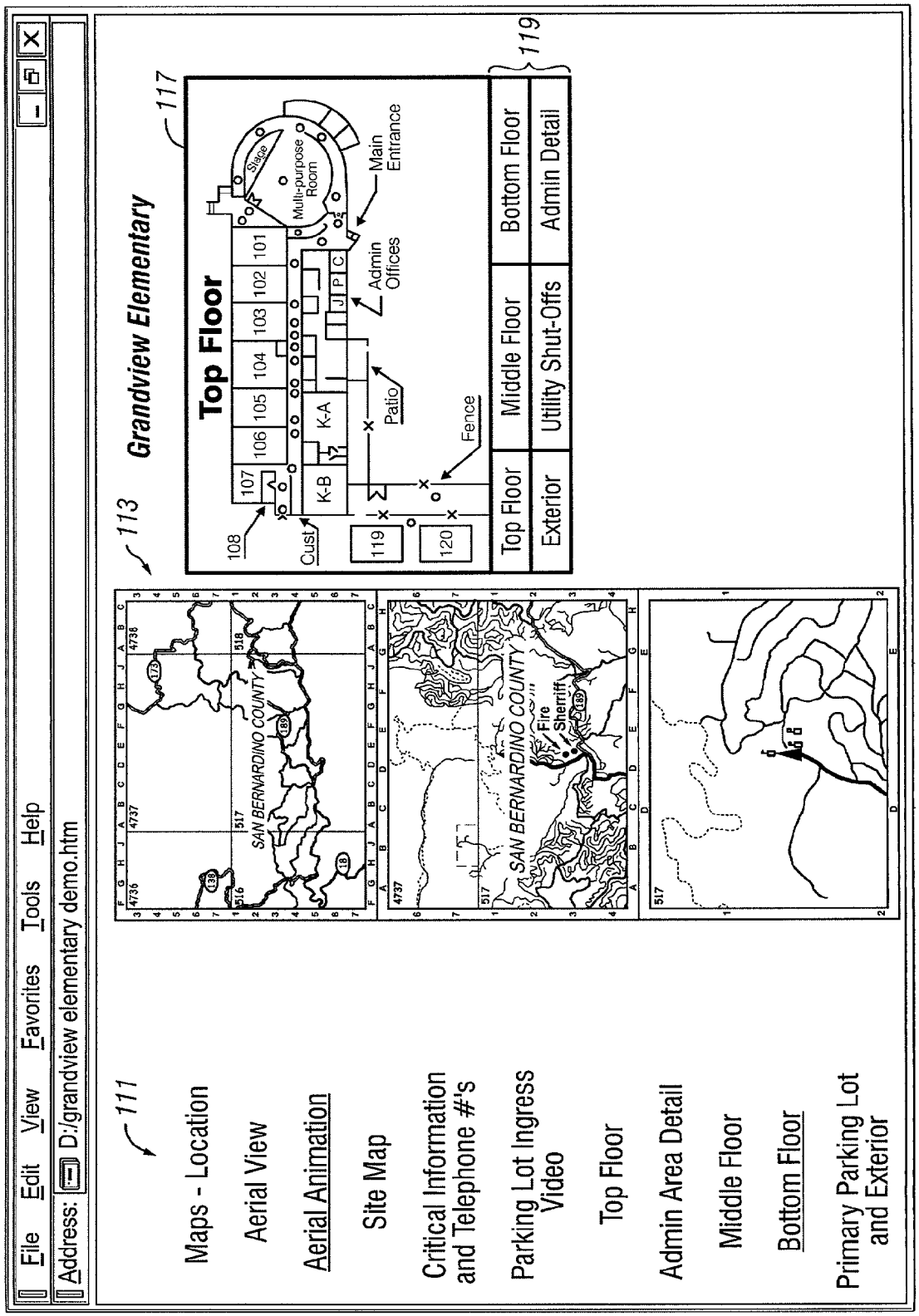
FIG. 2 illustrates an exemplary computer screen display after a user has selected a "top floor" icon from a menu window of the display screen of FIG. 1, in accordance with one embodiment of the invention.

The invention is described in detail below with reference to the figures wherein like elements are referred to with like numerals throughout. Although the description below is provided in the context of critical tactical information for a school campus, it is readily apparent to those of ordinary skill in the art that the principles and techniques of the present invention may be applied in a variety of other types of venues, buildings, campuses or scenarios (collectively referred to herein as "sites").

Emergency personnel frequently respond to the scene of incidents and threats with a minimal amount of information regarding the site. In order to overcome this lack of "intelligence," the invention provides a computer-based method and system for quickly and easily accessing and viewing various types of tactical information that may be desired by emergency personnel.

In one preferred embodiment, a computer system includes a CD-ROM drive that accesses program instructions and/or data from a CD ROM to provide desired critical information in various formats (e.g., text, graphics, video) on a computer screen display. As emergency personnel receive an emergency dispatch, a CD ROM for a particular site they are approaching may be loaded into the CD-ROM drive of the computer. In a preferred embodiment, the computer may be an in-vehicle computer system of an emergency personnel carrier (e.g., police squad car or van) which allows emergency personnel to access critical information pertaining to the particular site during transit to the site. The computer system further includes a hard drive, read-only memory (ROM) and/or random access memory (RAM) for storing program instructions executed by the CPU of the computer system. The computer system provides a graphic user interface on the computer monitor that allows users to specify desired information as described in further detail below.

In one preferred embodiment, the desired information is stored in a computer-readable storage medium (e.g., CD ROM, hard drive, ROM, Flash memory, RAM, floppy disk, etc.) and retrieved by the CPU in accordance with user requests and displayed to the user. In a further embodiment, the computer system includes a transceiver and antenna, and other processors, hardware and software known in the art, for retrieving critical information desired by the user via wireless communication protocols and techniques known in the art. As would be apparent to those of ordinary skill in the art, the actual hardware and software required for carrying out the functions described herein may be implemented in various ways in accordance with desired performance criteria. Those of ordinary skill in the art can readily design such hardware architectures and create/write such software programs, without undue experimentation, in accordance with the preferred embodiments of the invention described herein.

Figure 1:
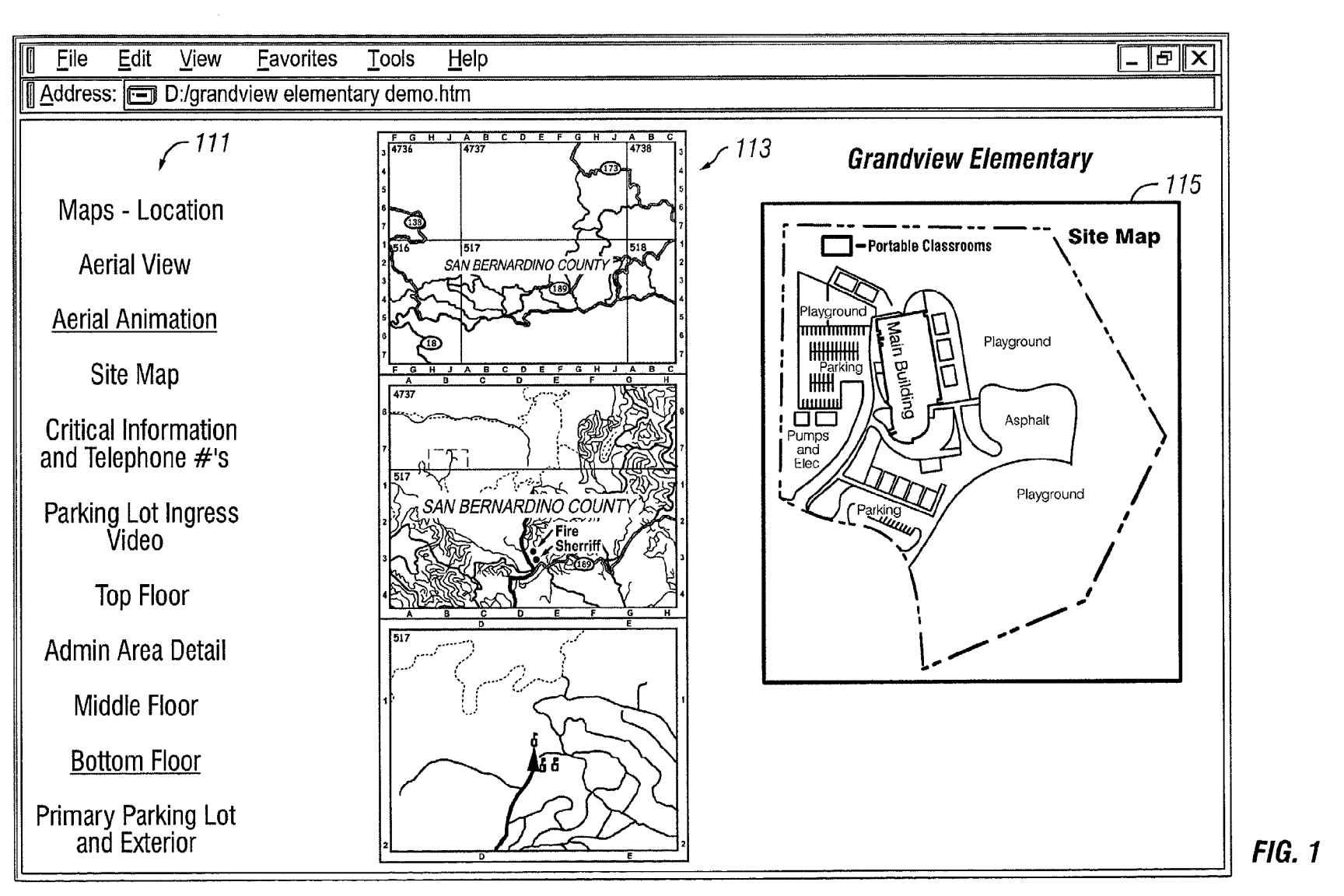

FIG. 1 illustrates an exemplary computer screen display that may be presented to a user for facilitating the retrieval of tactical information, in accordance with one embodiment of the invention. As shown in FIG. 1, a left portion or first window of the display screen contains a menu 111 of various types of information that may be retrieved by the user. A middle portion or second window contains geographic and street maps 113 illustrating the location of the target destination (in this example, Grandview Elementary School). A right portion or third window contains a site map 115 which illustrates ground layout and site details for Grandview Elementary School. This initial display screen assists emergency personnel to quickly arrive at the destination and provides an overall general layout of the grounds before they arrive.

If the user desires further details about a particular building or floor within a building, the invention can provide this information in a quick and easy manner. By using a mouse cursor or other pointer, or a keyboard, the user can select a "top floor" icon, for example, from the menu 111 and get a layout diagram of the building structure for the top floor. FIG. 2 illustrates a computer display screen that may appear upon selecting "top floor" icon or link from the menu window 111. As shown in FIG. 2, the third window now displays a top floor layout diagram 117 of the desired building. Within the "top floor" layout diagram 117 are embedded icons or links that may be selected to obtain further information about a particular room or area associated with that link. In FIG. 2, these links are shown as small circular icons distributed about the diagram at various locations corresponding to rooms and locations on the top floor of the building. In one embodiment, the links may also be room numbers (e.g., room nos. 101–107) or other descriptors associated with each room. If the user wants to obtain information about a particular room, he or she can select or click on a corresponding link or icon.

Additionally, in one embodiment, as the user moves a cursor above areas or rooms outlined by the layout diagram 117, corresponding pop-up text messages may be presented to the user to instantly provide location-specific information about the particular area or room. Methods of providing such pop-up text messages that are mapped to locations of a graphic image are known in the art and may be implemented using known and commercially available programs such as, for example, iPOP Pro Sensomap™ from Image Intelligence, Ltd., located in Herefordshire, United Kingdom.

Figure 3:
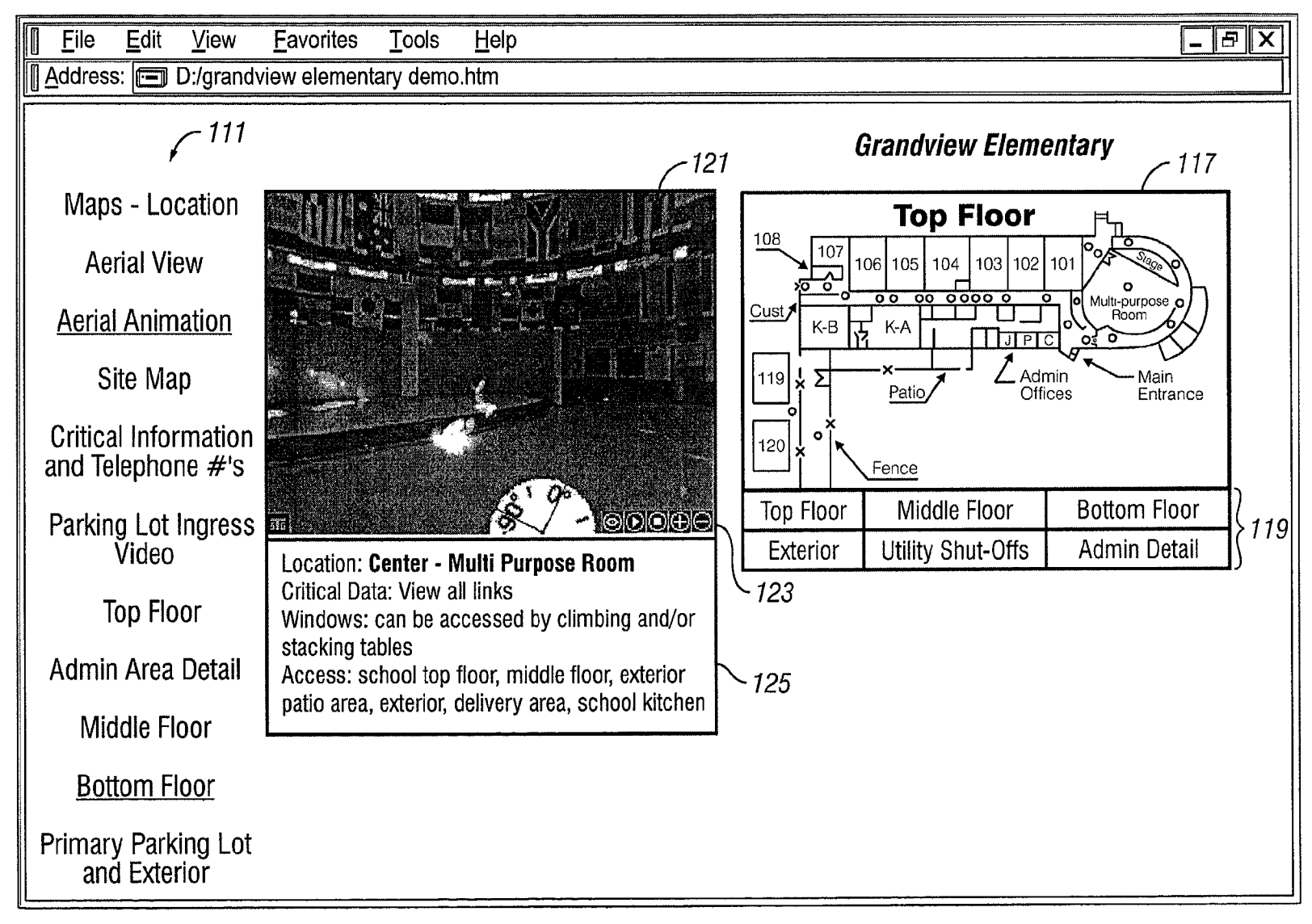

As further illustrated in FIG. 3, below the top floor layout diagram 117 are further links 119 that may be selected to obtain information about other features of the top floor such as utility shut-off information ("Utility Shut-Offs"), Administrative Office Details ("Admin Details"), or details about the exterior of the building ("Exterior"). The links 119 further include links to view a "Middle Floor" or "Bottom Floor" layout diagram for the building. It is appreciated that the additional links 119 are exemplary only. Links to any desired type of information whether they be in the form of text, graphic images, video or any combination of these formats, may be provided. These additional links 119 allow emergency personnel to quickly and easily identify additional information that is available and to obtain that information at a click of a button (e.g., a mouse button). FIG. 3 illustrates an exemplary display screen when a user has selected a link corresponding to a multi-purpose room in the top floor layout diagram 117. In the middle window, there is displayed a 360 degree spherical digital image 121 of the multi-purpose room. In a preferred embodiment, a user may navigate in this room by dragging a mouse cursor in a desired direction. In this fashion, the user can "look" up, down, right or left (or any combination of these directions) as if he or she were physically present in the room. In a preferred embodiment, known spherical digital imaging and software technology is used to provide the navigational spherical image of the room. Such spherical digital imaging technologies and methods of navigating in the images, so as to change the perspective or directional view shown to the user, are known in the art. Furthermore, as shown in FIG. 3, the user may zoom in, zoom out and automatically pan the room by selecting appropriate control icons 123 located in the lower, right corner of the digital image. Other known digital imaging functionalities (e.g., color enhancement, etc.) may be implemented as well. As also shown, under the spherical image 109 there is a sub-window 125 for displaying further textual information about the particular room or area selected that may be useful to emergency personnel.

In a preferred embodiment, as the user's mouse cursor moves over particular objects/structures within the spherical image, pop-up messages (not shown) may appear that provide critical information or instructions. For example, if the mouse cursor pans over a door, a pop-up message may appear containing information such as where the door leads to, material and thickness of the door, whether it opens inwardly or outwardly, where the hinges are located, etc. The pop-up message may further provide instructions such as "double click to proceed through door into next room."

Figure 4:
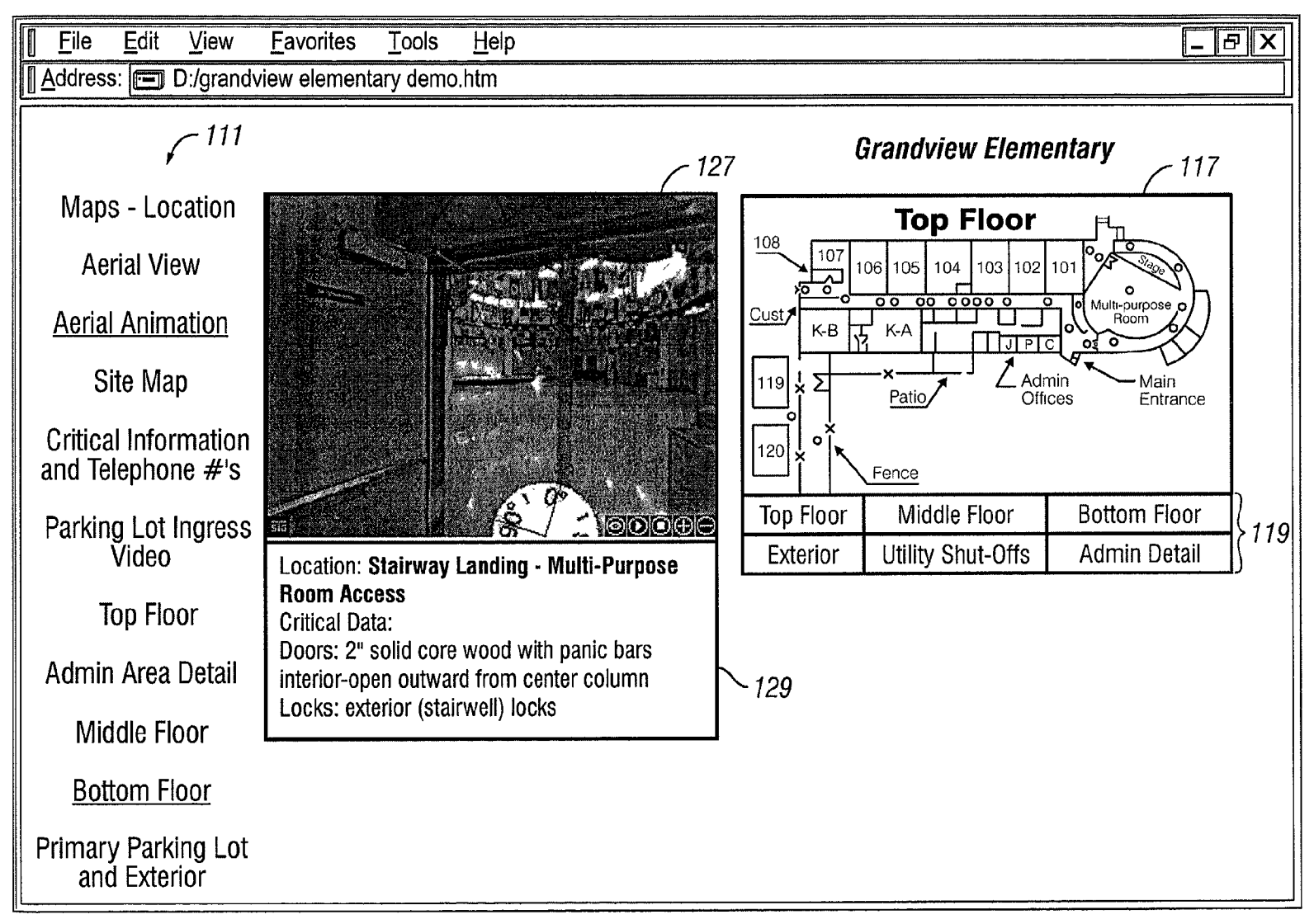

FIG. 4 illustrates a display screen after a user has clicked on a door from inside the multi-purpose room shown in FIG. 3. The middle display window now shows an image 127 of a view that would be seen by someone standing outside of the door, looking into the multi-purpose room. This image 127 is also a 360 degree spherical image and, therefore, the user may look up, down, to the right or to the left while standing at that point, as discussed above with respect to FIG. 3. As further illustrated in FIG. 4, the middle window further includes a sub-window 129, below the spherical image 127, that contains additional information about the area depicted in the image 127. In the example shown, the sub-window 129 contains additional information regarding current location and details about the particular doors shown in the image 127.

Figure 5:
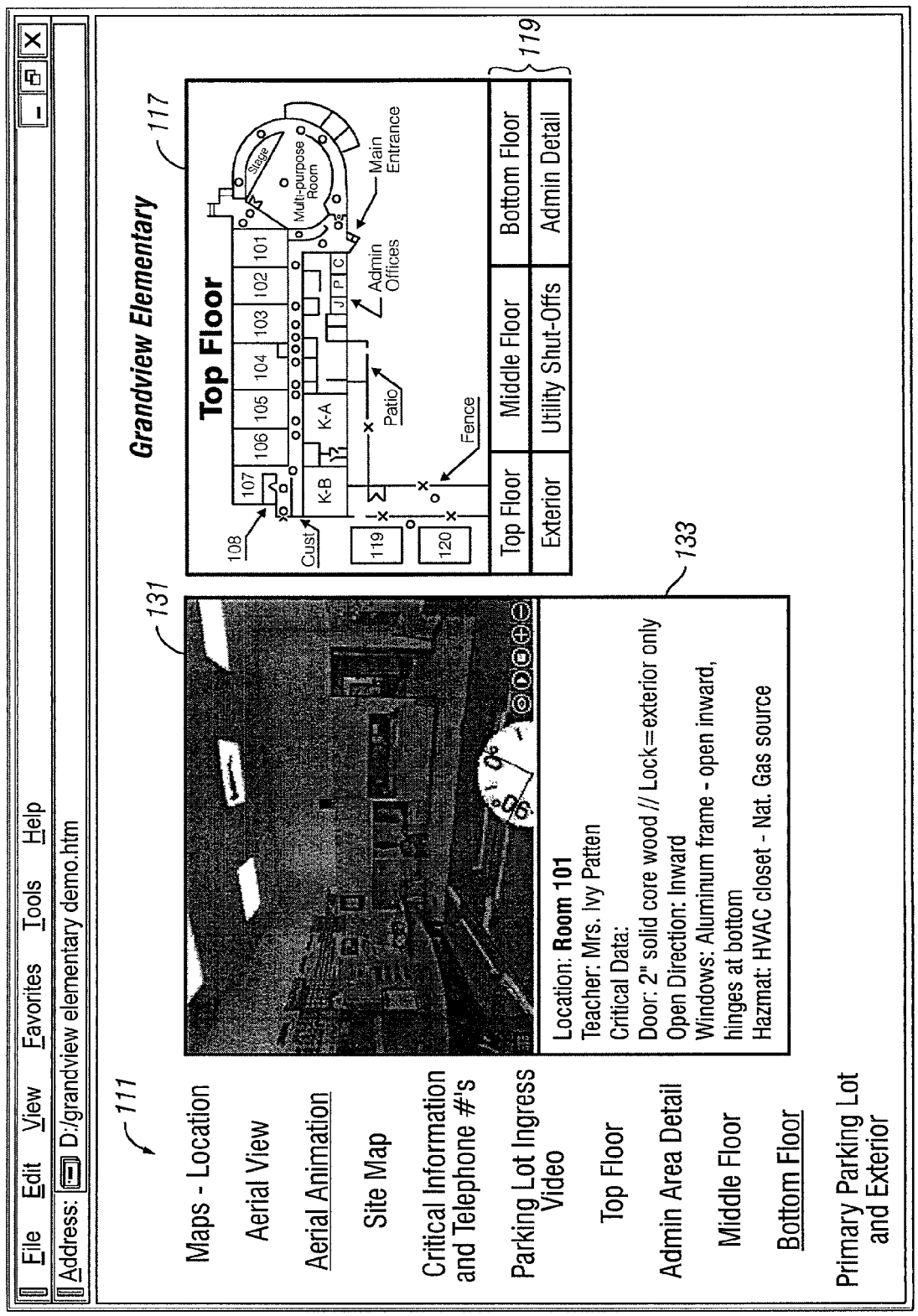
FIG. 5 illustrates an exemplary computer screen display after a user has selected a link icon corresponding to "room 101" from the "top floor" layout diagram of FIG. 2, in accordance with one embodiment of the invention.

If the user is now interested in another room, he or she does not have to continue navigating through spherical images, which can become confusing, especially during a crisis situation. Instead, the user can simply return to the "top floor" layout 117 displayed in the third window and click on a desired room to "jump" into that room. FIG. 5 illustrates a display screen after a user has selected a link icon corresponding to room 101 from the layout diagram 117 in the third window. The middle window now contains a spherical digital image 131 of the selected room (e.g., room 101 of the top floor). As described above, a user may navigate in this image and view the entire room as if he or she is virtually present in the room. In a preferred embodiment, pop-up messages (not shown) are also implemented in this image. Thus, if the user pans over the image using a mouse cursor, for example, as the cursor becomes positioned over particular objects or areas within the image, pop-up messages may be programmably implemented to appear as desired by the designer of the method and system of the present invention. Such pop-up messages and methods of implementing the same in a graphic user interface (GUI) environment are well known in the art. As shown in FIG. 5, just below the spherical image 131 is a sub-window 133 which provides further details concerning the room shown in the spherical image 131.

Figure 6:
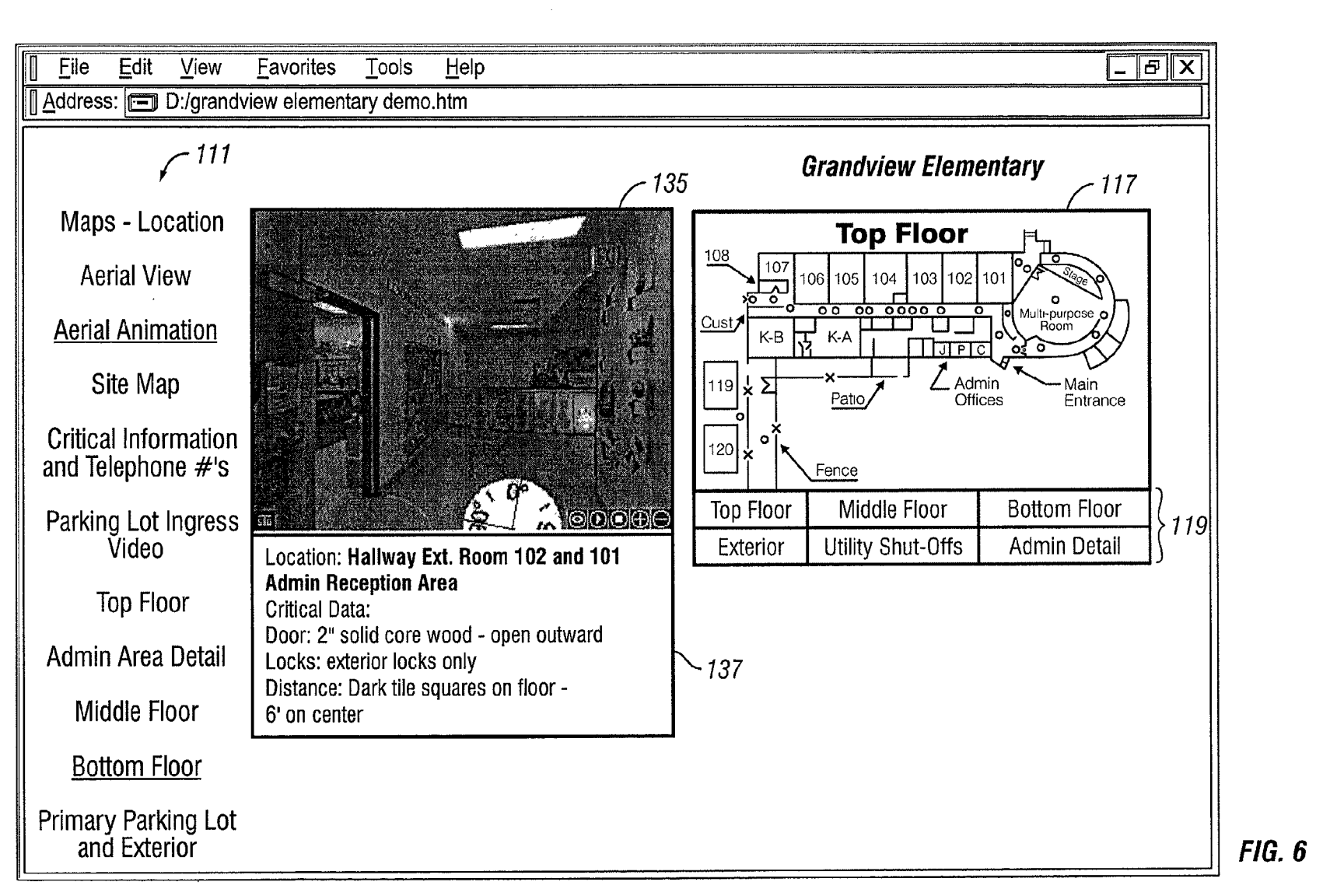

If the user desires to exit room 101 through the door shown on the right portion of the image 131, he or she may position a mouse cursor, for example, over the door and click once or twice to indicate a desire to proceed through the door. FIG. 6 illustrates a display screen after such a process has occurred. The user is now presented with a spherical image 135 of the hallway just outside of room 101 as shown in FIG. 6. A sub-window 137 provides further detailed information about the hallway shown in image 135.

In one preferred embodiment, the invention further provides the ability to retrieve refined layout diagrams of portions of the top floor, or any other floor for that matter, which may be of particular interest to emergency personnel. For example, if emergency personnel desire further detailed information about the administrative offices, such personnel may obtain the information by selecting an "Admin Offices" icon or link in the layout diagram 117 or selecting "Admin Detail" icon 119 as shown in FIG. 6.

Figure 7:
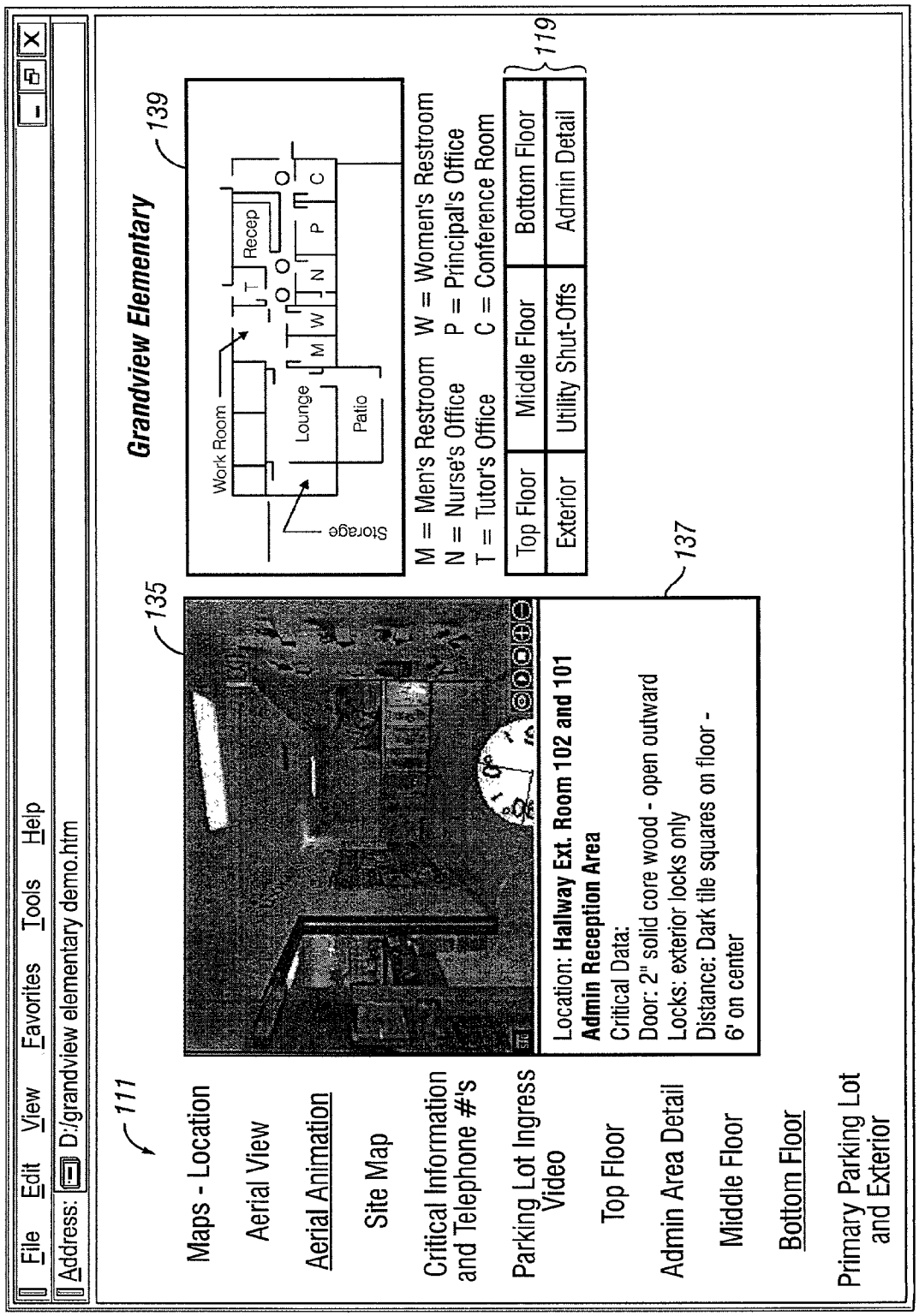
FIG. 7 illustrates an exemplary detailed layout diagram of the Administrative Offices in the third window of the display screen after a user has selected an "Admin Offices" icon in the layout diagram of FIG. 6, in accordance with one embodiment of the invention.

FIG. 7 illustrates a refined layout diagram 139 of the administration offices located on the top floor, shown in the right window of the display screen, presented to the user after he or she has selected the "Admin Offices" link in the layout diagram 117 (FIG. 6). In a preferred embodiment, located under this refined layout diagram 139, further detailed information pertaining to that area of the top floor is presented to the user. For example, each room is labeled and identified (e.g., M=mens restroom, W=woman's restroom, N=nurse's office, P=Principal's office, etc.). By selecting/clicking on a link icon for a particular location, a spherical image corresponding to that location can be displayed in the middle window.

Figure 8:
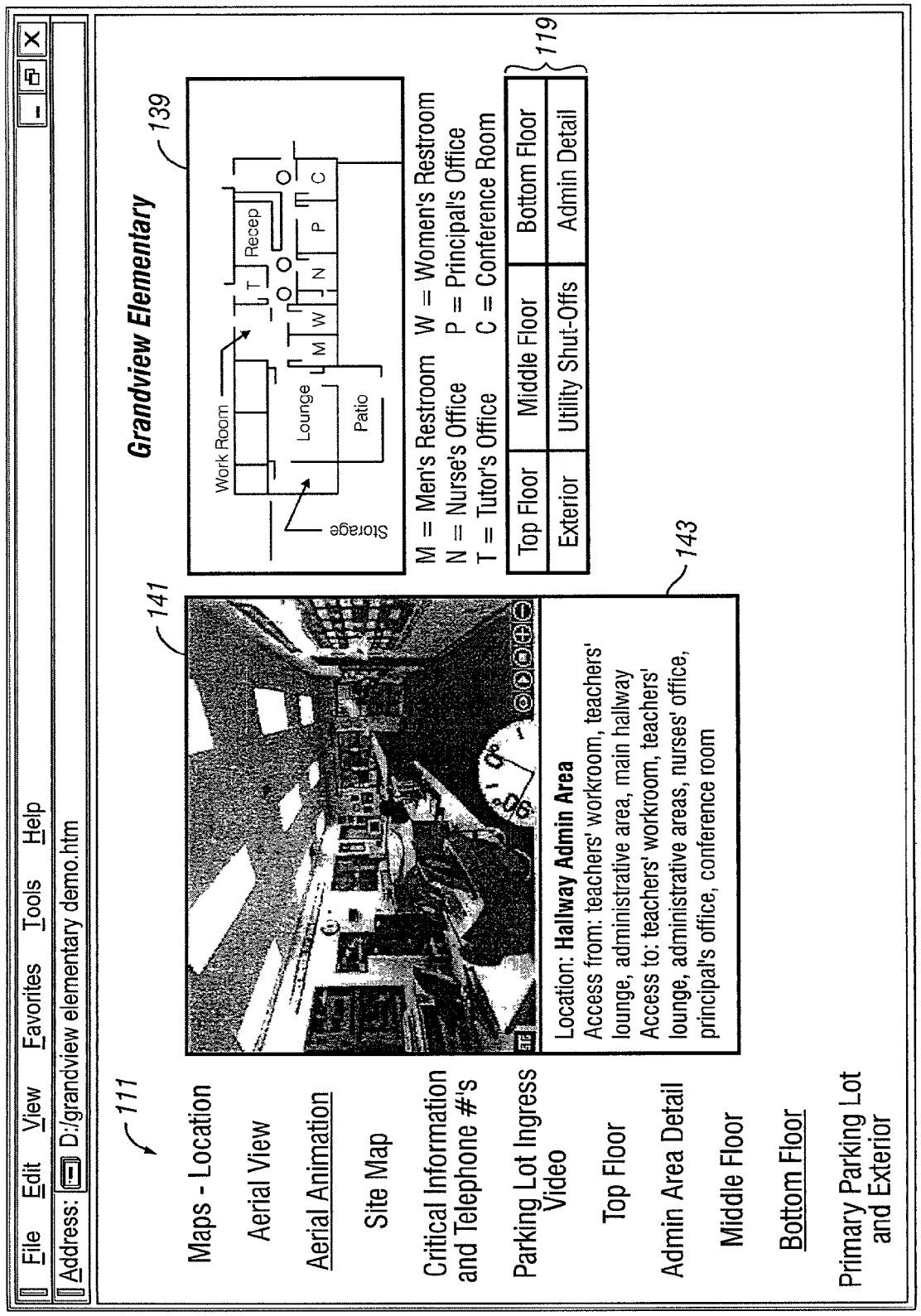
FIG. 8 illustrates an exemplary computer screen display after a user has selected a link icon corresponding to an area in the "Admin Offices" layout diagram of FIG. 7, in accordance with one embodiment of the invention.

FIG. 8 illustrates a new spherical image 141 that is displayed to the user after the user has selected a link icon corresponding to the hallway and reception area just outside of the administration offices. The spherical image 141 contains all the attributes and functionality as those described above. Again, a sub-window 143 below the image window 141 provides additional detailed information about the selected area that may be useful to emergency personnel.

Figure 9:
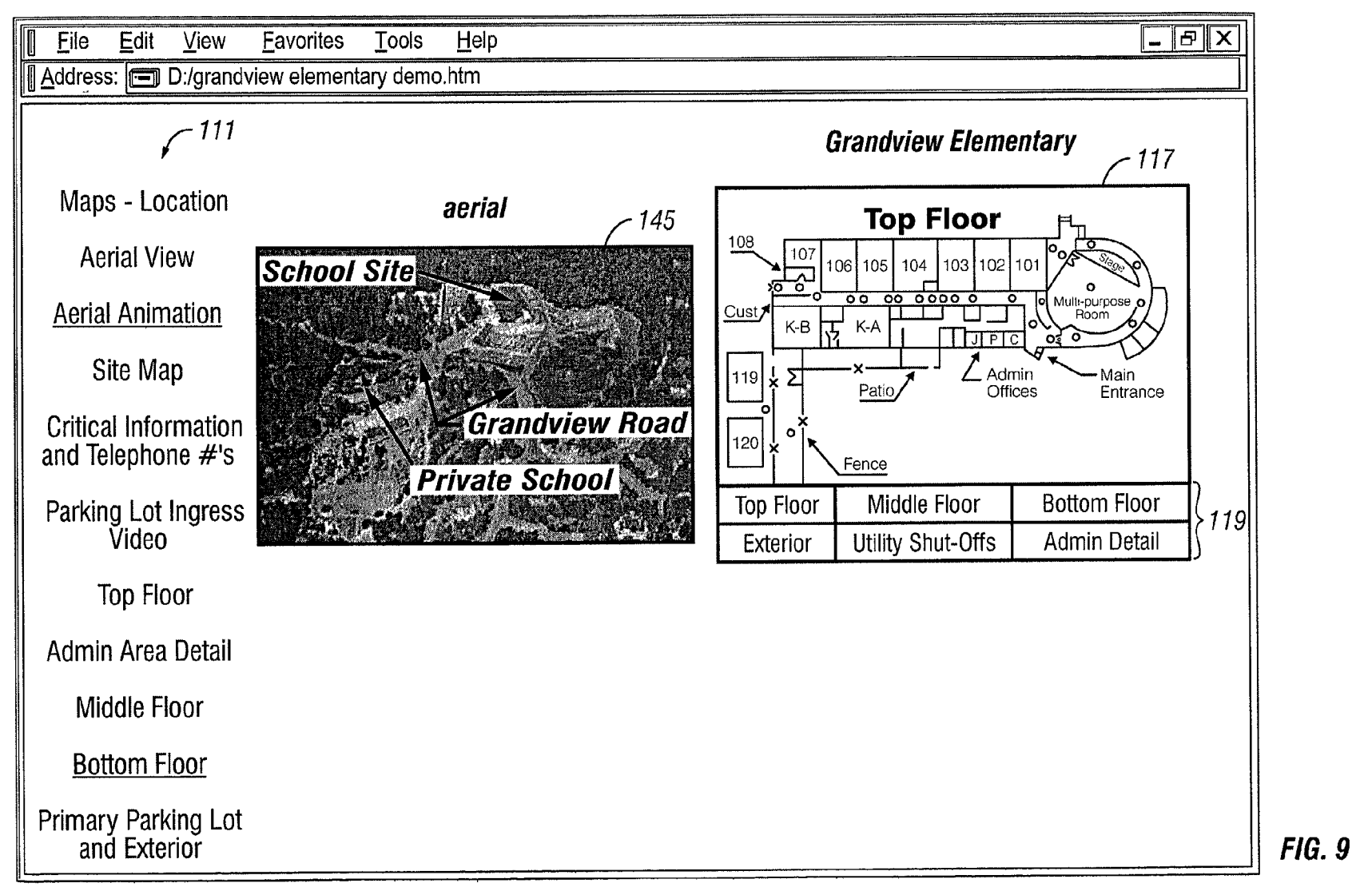

The invention allows emergency personnel to access various other types of information with ease and speed. For example, by clicking on the link "Aerial View" in the menu 111 presented in the left window of the computer screen display, an aerial view image 145 is displayed in the middle window as shown in FIG. 9. This view may be useful, for example, to emergency personnel arriving at the scene in aircraft such as helicopters or planes. Furthermore, in one embodiment, an animated aerial video may be displayed to the user by clicking on the icon "Aerial Animation" provided by the menu 111 located in the left window of the display.

Figure 10:
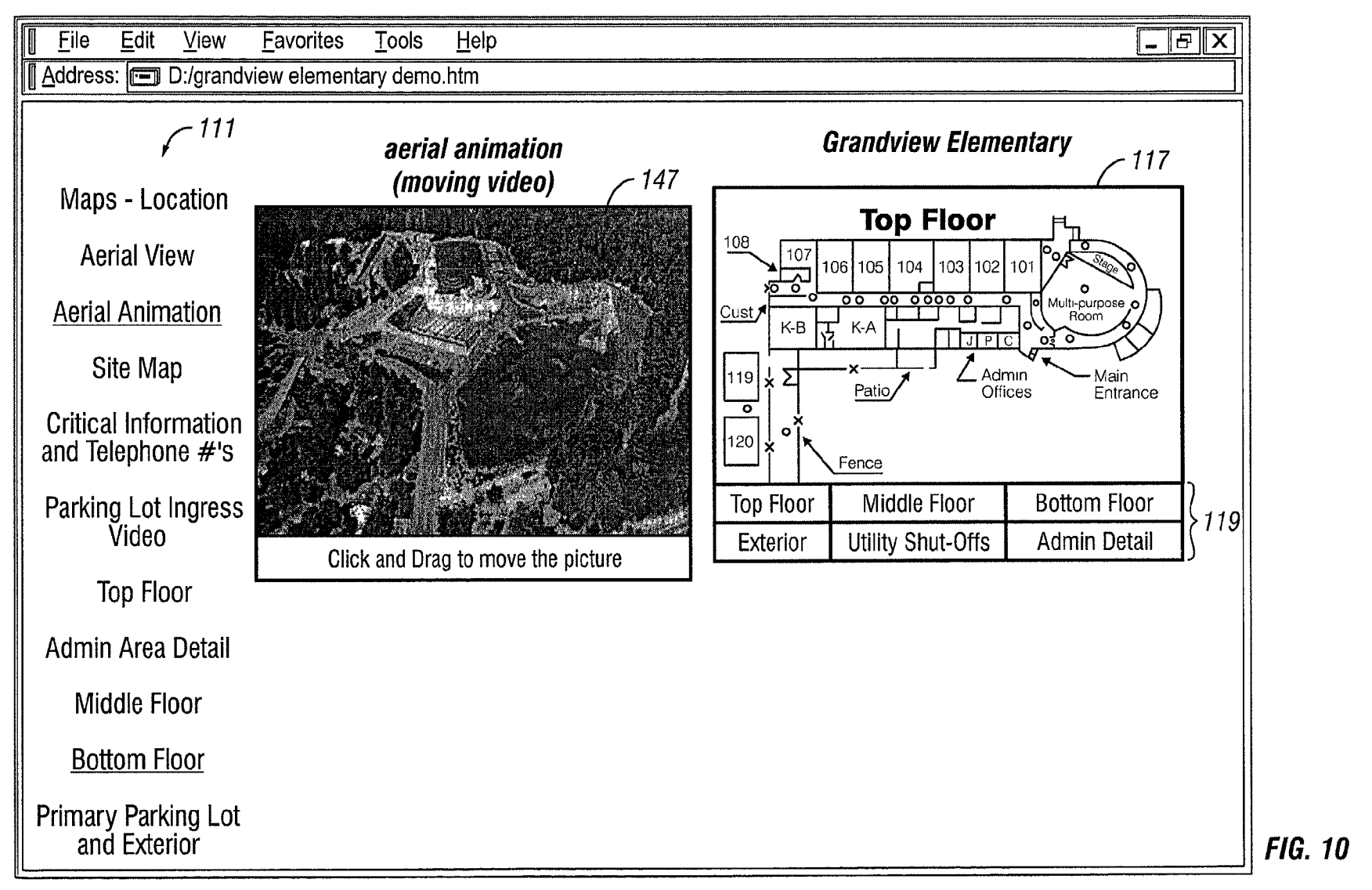

FIG. 10 illustrates that the middle window, in response, displays a moving video image 147 recorded while flying above and around the Grandview Elementary campus. In a preferred embodiment, the video 147 is a sequence of high-resolution still images that supports zoom-in and zoom-out functionality, created using commercial off-the-shelf software. In a preferred embodiment, by clicking and dragging a mouse cursor in a desired direction in the video image 147, various aerial perspectives may be instantly viewed by the user. As would be apparent to those of ordinary skill in the art, the quality (e.g., frame speed and resolution) of the moving video presentation will be largely dependent on the processing capabilities and speed, and memory capacity of the computer system. Therefore, it is desirable to have a computer system that includes a fast processor and large memory capacity. In a preferred embodiment, the computer system includes at least an Intel Celeron™ 500 MHz CPU, 256 Kbytes of Cache, 256 Kbytes of RAM and a 5 GByte hard drive. In a preferred embodiment, the system includes an Intel Pentium III™ 500 MHz CPU, 256 Kbytes of Cache, 256 Kbytes of RAM and a 20 GByte hard drive.

In another embodiment, the menu 111 further provides a "site map" link that allows a user to retrieve and view a site map of the desired site in either the second or third window. An exemplary site map is shown in the right window of FIG. 1. Such a site map would include details concerning the relative locations and layout of buildings, parking lots, fields, and other areas on the site. Thus, emergency personnel can obtain an overview of the layout and topography of the site at a click of a button. In one preferred embodiment, a site map is provided as a default window in an initial computer screen display that is presented to the user by the method and system of the present invention.

Figure 11:
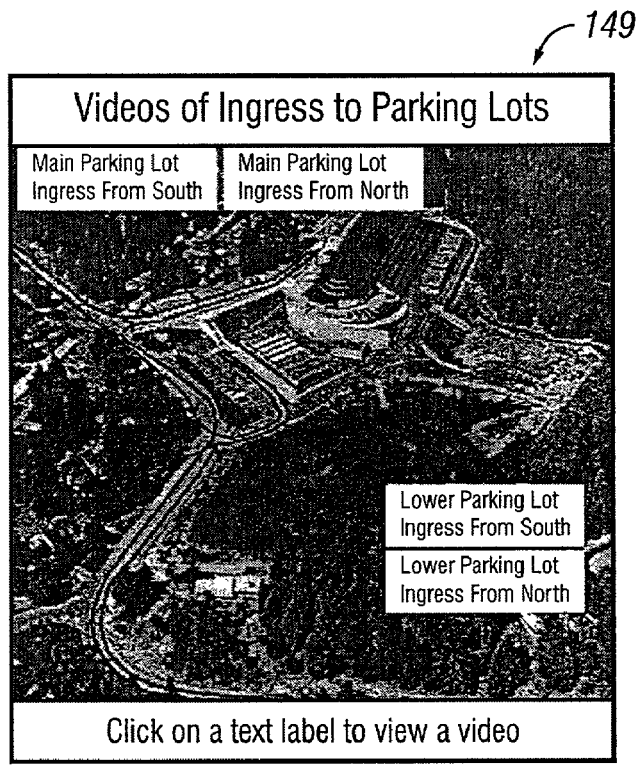
FIG. 11 illustrates an exemplary window display after a user has selected a "Parking Lot Ingress Video" icon from the menu window, in accordance with one embodiment of the invention.
Figure 12:
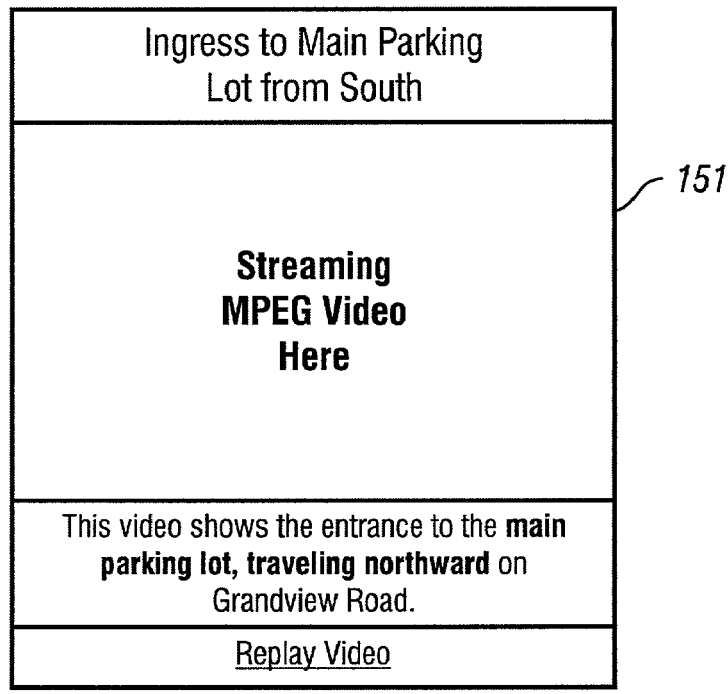
FIG. 12 illustrates an exemplary streaming video display after a user has selected an ingress video option from the window display of FIG. 11, in accordance with one embodiment of the invention.

Other types of critical tactical information may include information pertaining to the different routes/roads that may be taken to enter a particular site. By clicking on the link "Parking Lot Ingress Video" from the menu 111, a user may obtain various videos showing the landscape and overall topology of different routes of access to the site. FIG. 11 illustrates an exemplary video image 149 that may be displayed in a right window section, for example, of the computer screen display. As shown in FIG. 11, this window illustrates and labels four possible routes for entering the campus. A user may then select one of these routes by clicking on the appropriate link label. For example, if the user selects the link "Main Parking Lot Ingress From South," in a preferred embodiment, the middle window will display a streaming MPEG video 151 of camera footage taken while entering the campus by that route, as shown in FIG. 12. Note, however, an illustration of the actual moving video is omitted in FIG. 12.

Figure 13:
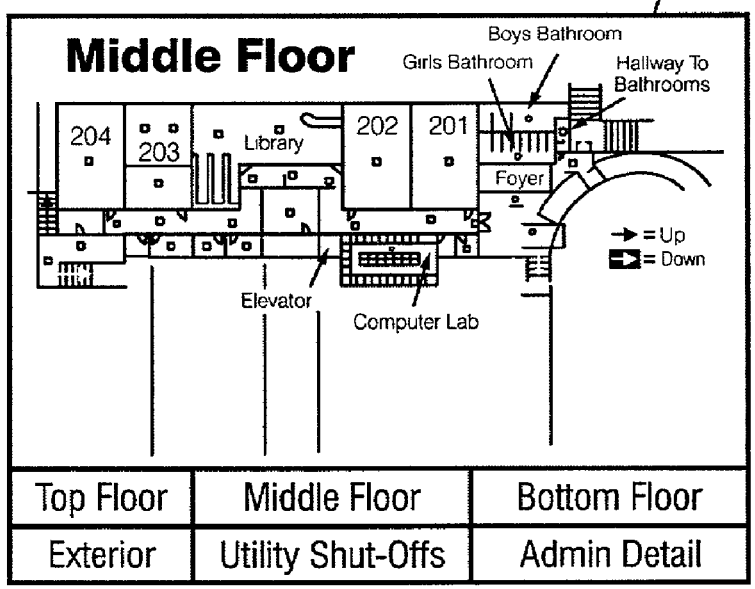
FIG. 13 illustrates an exemplary "middle floor" layout diagram, in accordance with one embodiment of the invention.
Figure 14:
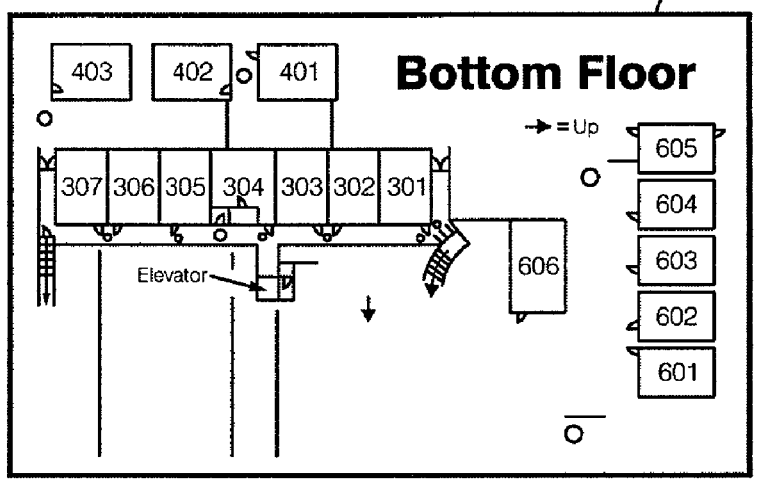
FIG. 14 illustrates an exemplary "bottom floor" layout diagram, in accordance with one embodiment of the invention.

By selecting appropriate menu items from the menu 111 in the left window of the computer screen display, information pertaining to other floors of a building may be obtained. FIGS. 13 and 14 illustrate layout diagrams 153 and 155 for the middle and bottom floors, respectively. These can be navigated and used to view spherical images of desired rooms or areas as described above with respect to the top floor diagram. Obviously, if a building has many floors, additional menu items specifying floor numbers may be provided in the window.

Figure 15:
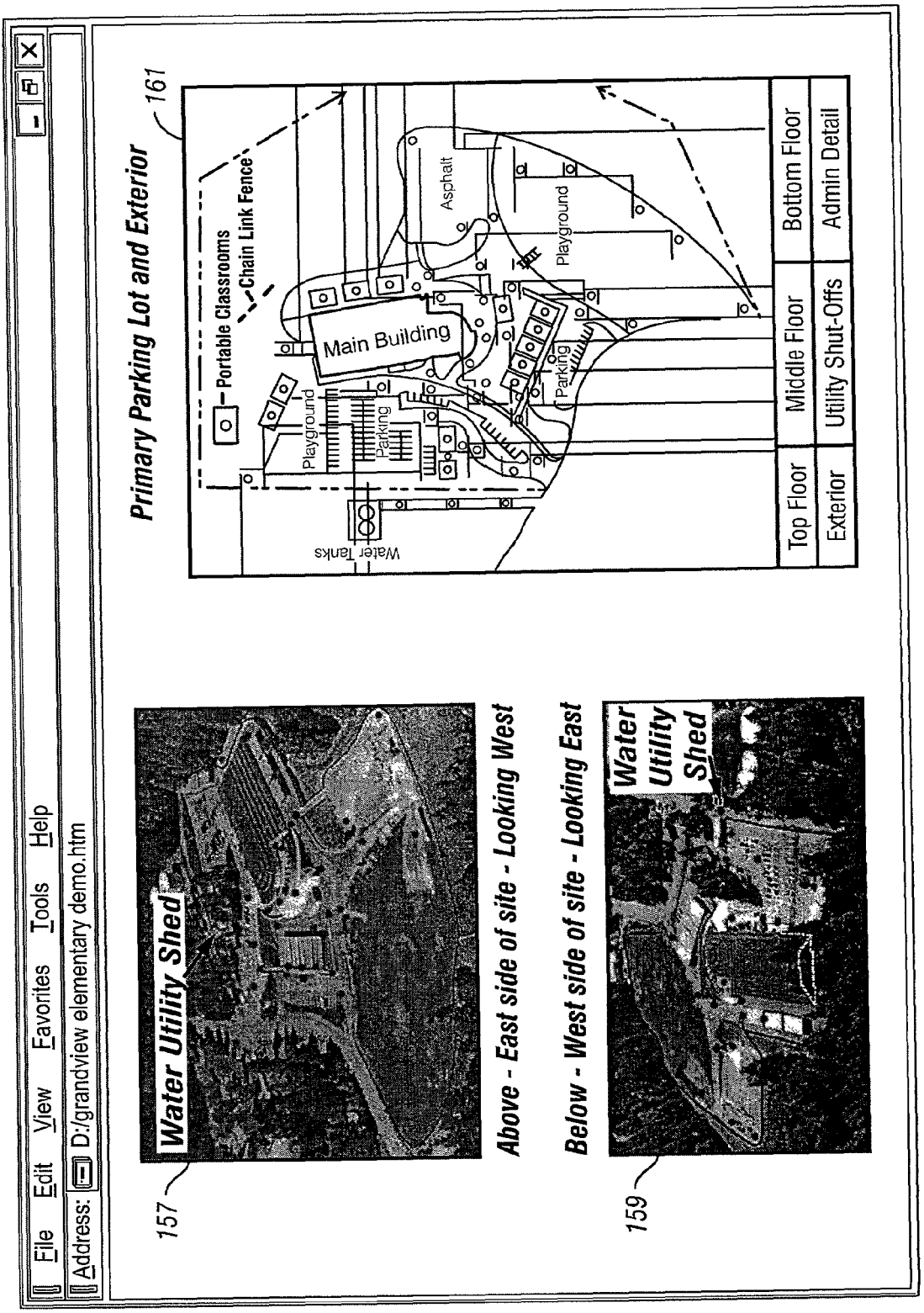
FIG. 15 illustrates an exemplary display window containing three scenes after a user has selected a "Primary Parking Lot and Exterior" icon from the menu window, in accordance with one embodiment of the invention.
Figure 15A:
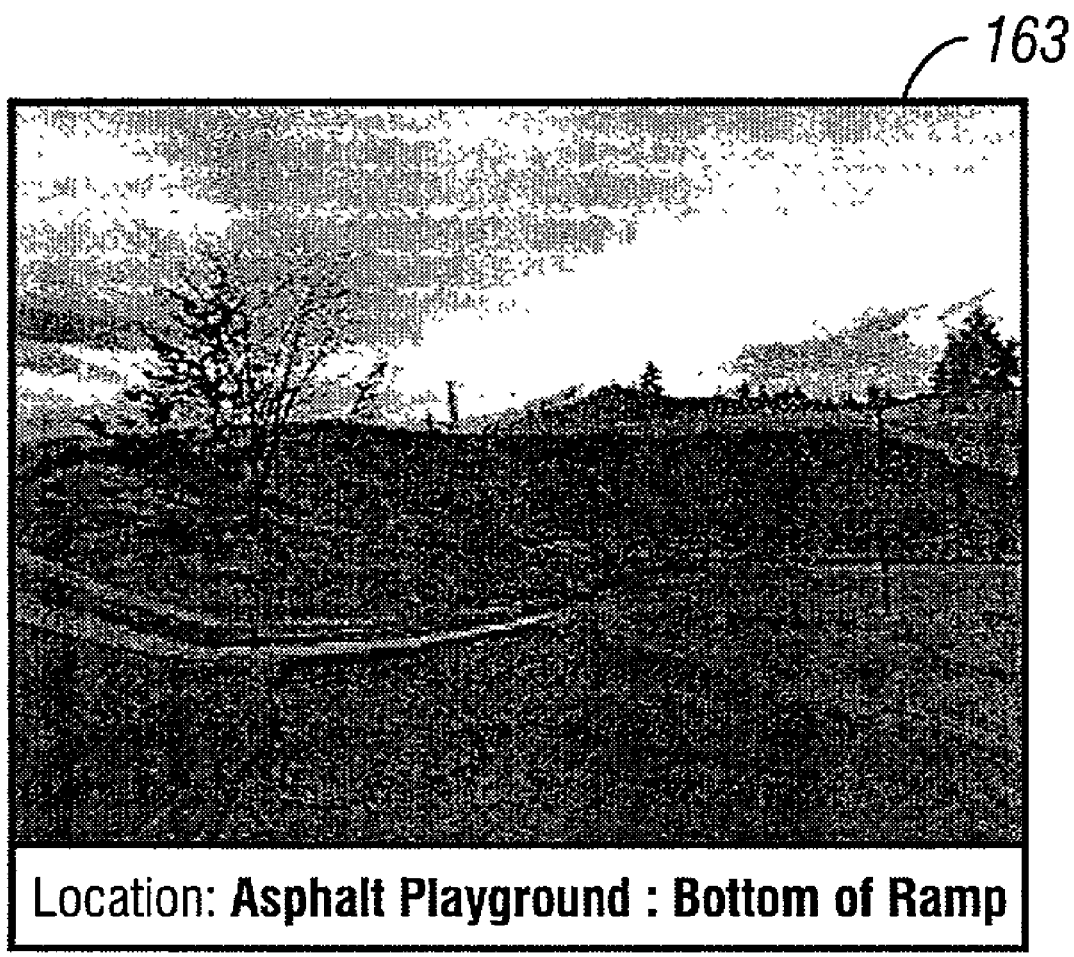
FIG. 15A illustrates an exemplary spherical image of an "Asphalt Playground" that is displayed after a user selects a link located in the lower right corner of the middle scene of FIG. 15, in accordance with one embodiment of the invention.

FIG. 15 illustrates an exemplary display window containing three exemplary scenes 157, 159 and 161, after a user has selected the "Primary Parking Lot and Exterior" icon from the menu 111. As shown in FIG. 15, each of the three scenes show a unique perspective of the campus that may be useful in different ways to emergency personnel. As before, link icons are strategically placed in each of these scenes or images to enable the user to retrieve spherical images corresponding to a particular location or area in a respective image. These links can be seen as small dots in each of the scenes. FIG. 15A illustrates a spherical image 163 that is displayed in the middle window of the display after a user clicks on a link located in the lower right corner of image 157, for example, of FIG. 15.

Figure 16:
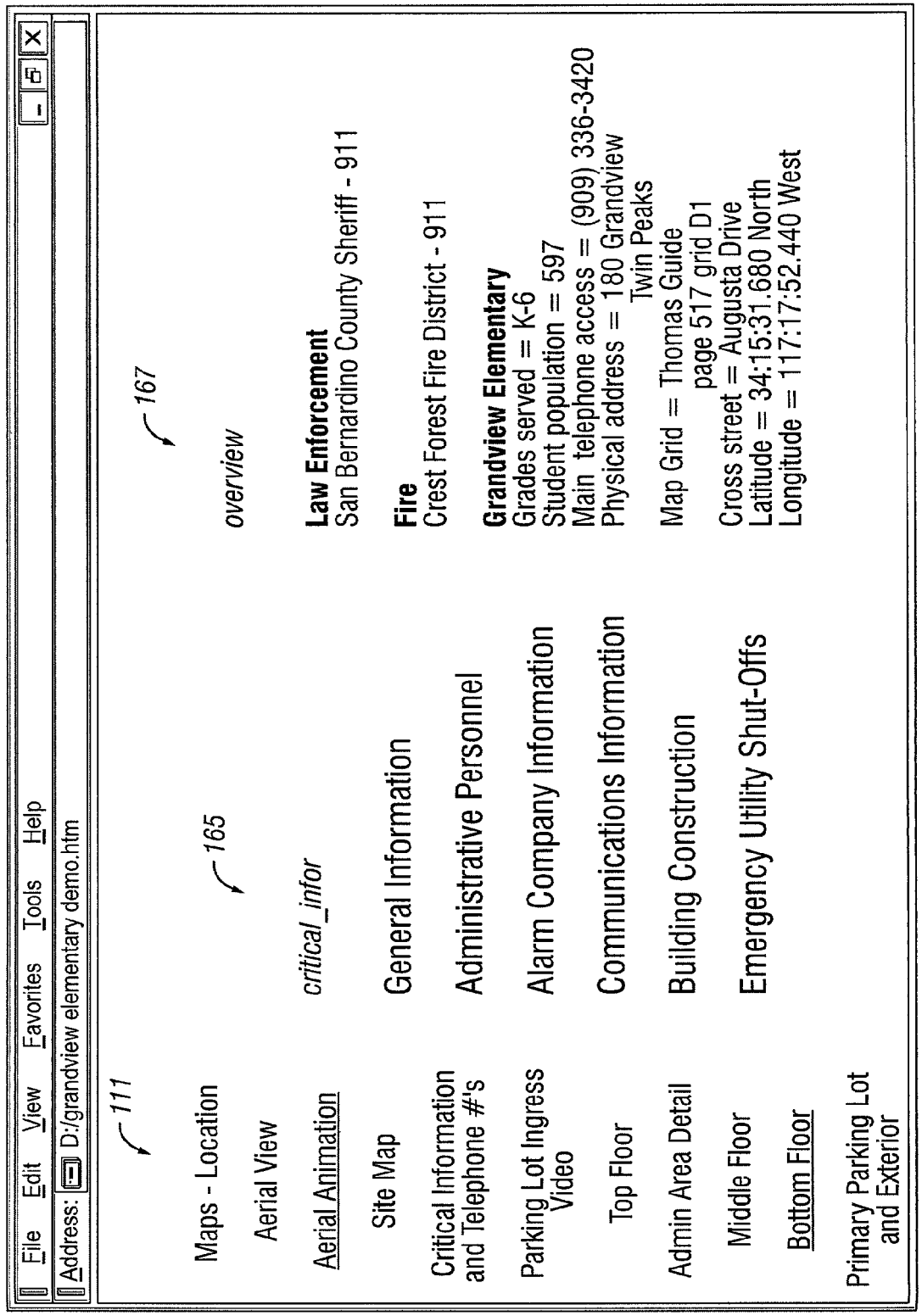
FIG. 16 illustrates an exemplary computer screen display after a user has selected a "Critical Information & Telephone #'s" icon from the menu window, in accordance with one embodiment of the invention.

In a preferred embodiment, by selecting the icon "Critical Information & Telephone #'s" in the menu 111, the user can access a large variety of information that may be needed in a crisis situation. FIG. 16 illustrates an exemplary computer screen display that is presented to the user after he or she has selected the "Critical Information & Telephone #'s" icon. The display provides a critical information index 165 in the middle window that allows the user to further refine his or her criteria to more specific types of information. In the example shown in FIG. 16, the user has further selected "General Information" from the index 165 to view general information 167 for Grandview Elementary presented in a right window of the display. By selecting other items from the index 165, the user may obtain other desired information.

Figure 18:
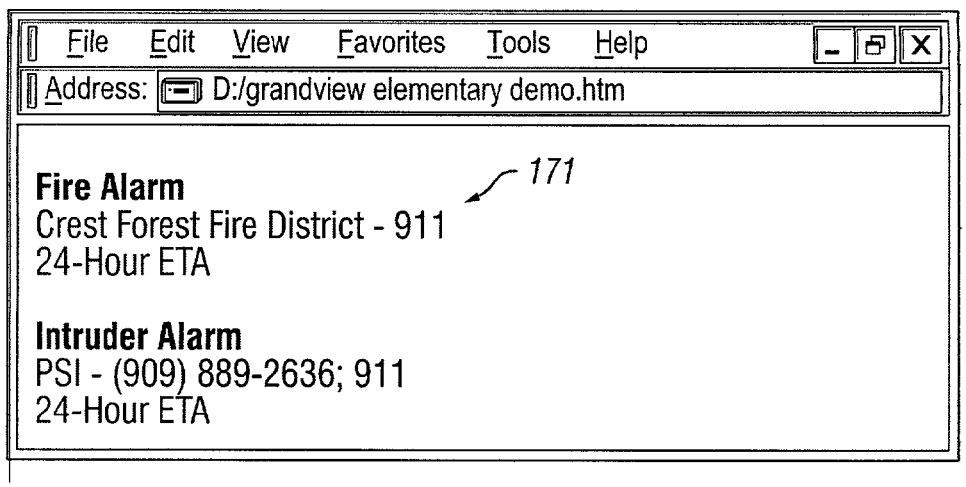
FIG. 18 illustrates an exemplary display window after a user has selected an "Alarm Company Information" icon shown in FIG. 16, in accordance with one embodiment of the invention.
Figure 19:
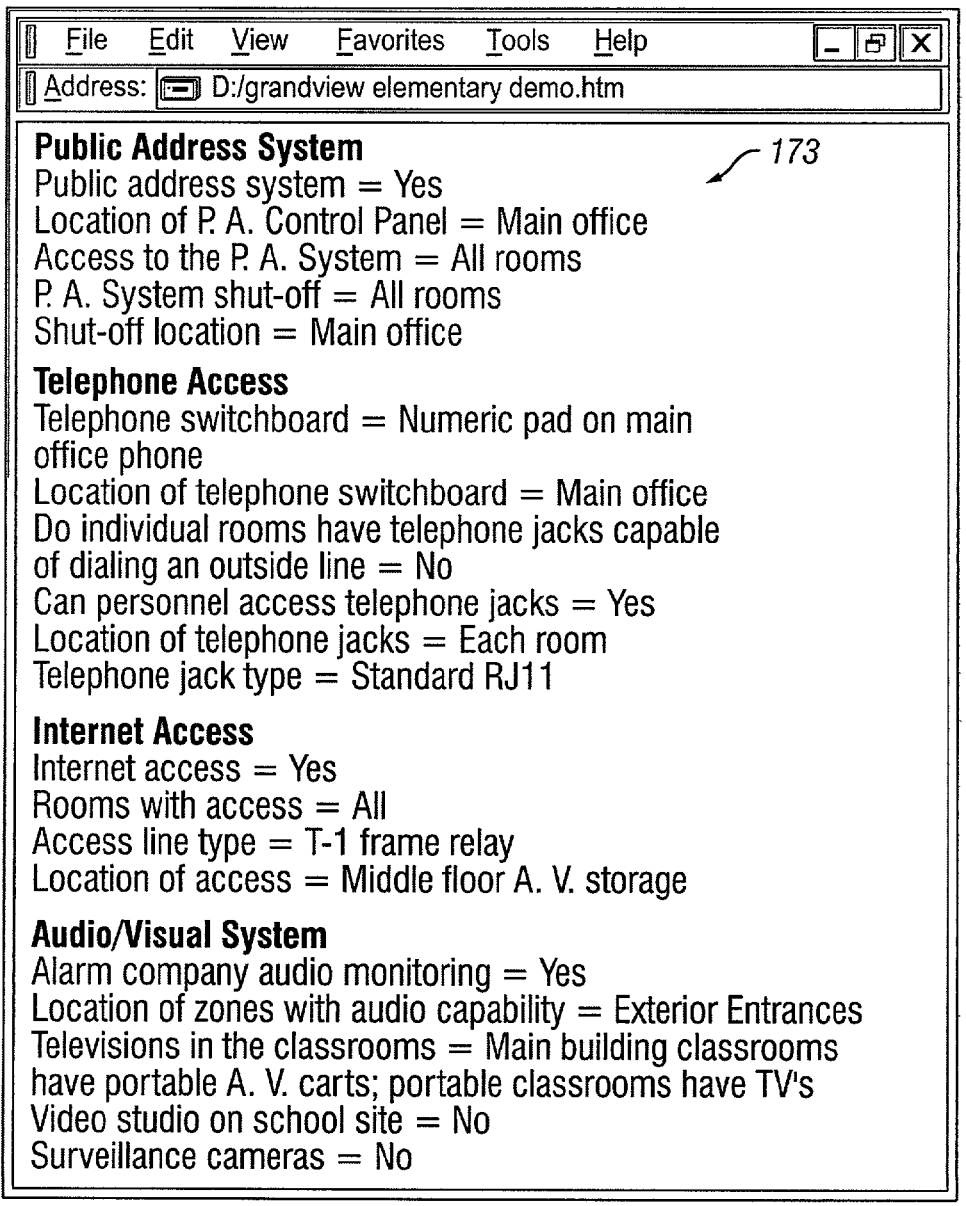
FIG. 19 illustrates an exemplary display window after a user has selected a "Communications Information" icon shown in FIG. 16, in accordance with one embodiment of the invention.
Figure 20:
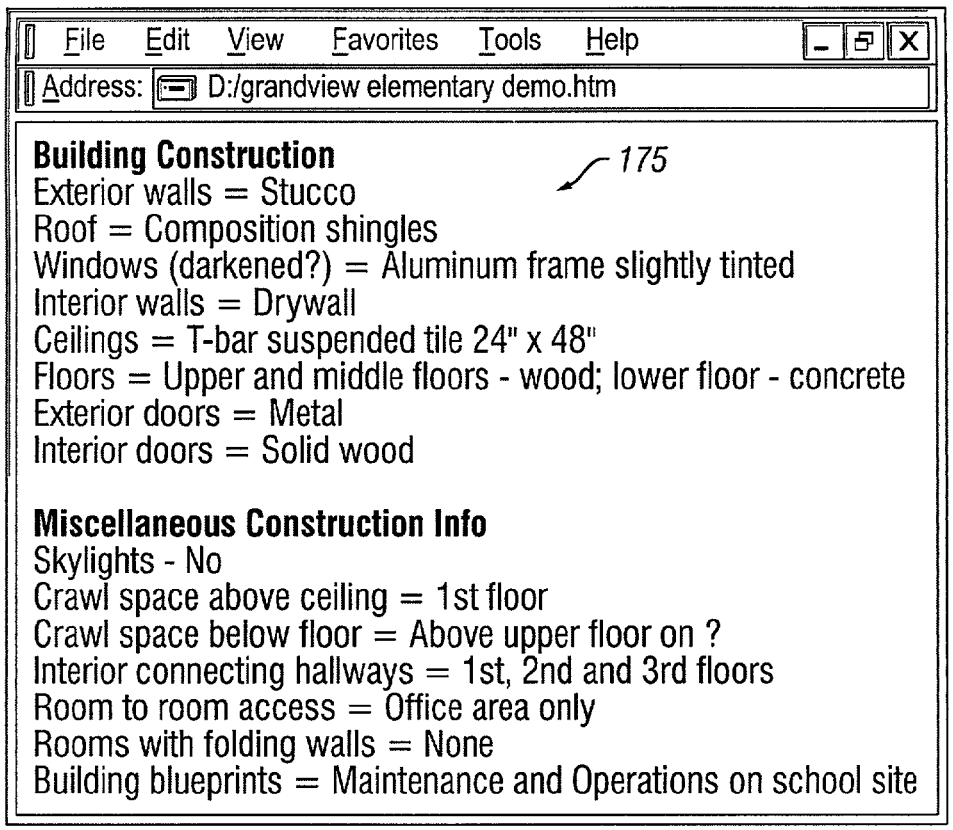
FIG. 20 illustrates an exemplary display window after a user has selected a "Building Construction" icon shown in FIG. 16, in accordance with one embodiment of the invention.
Figure 21:
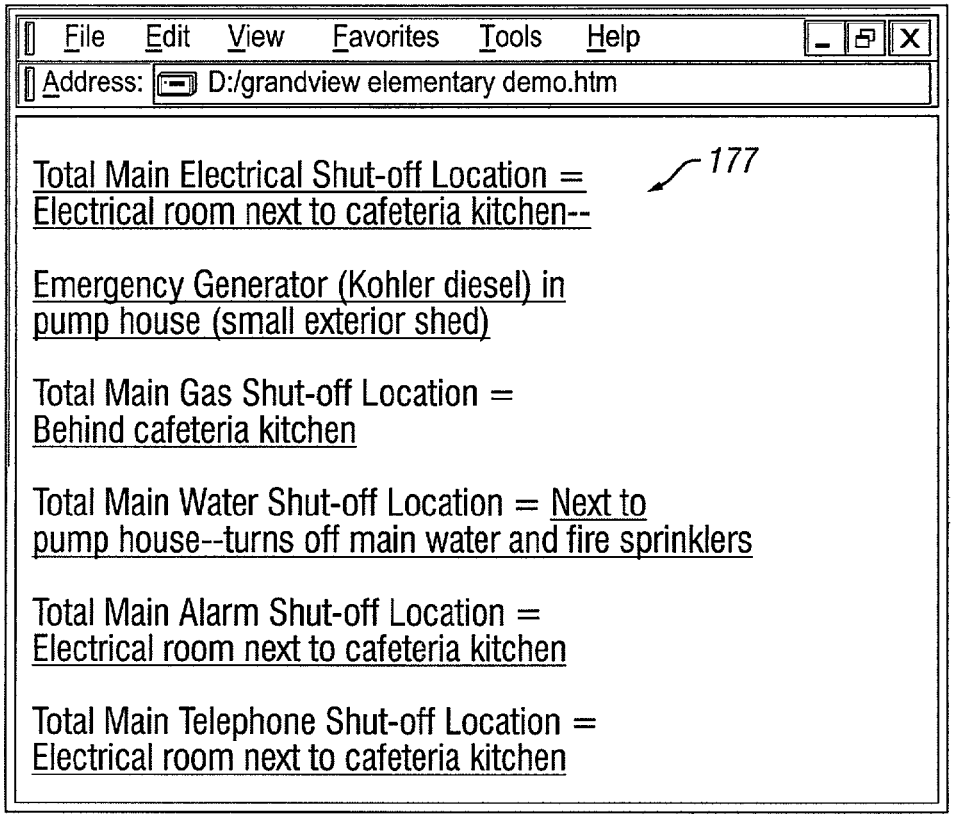
FIG. 21 illustrates an exemplary display window after a user has selected an "Emergency Utility Shut-Offs" icon shown in FIG. 16, in accordance with one embodiment of the invention.
Figure 23A:
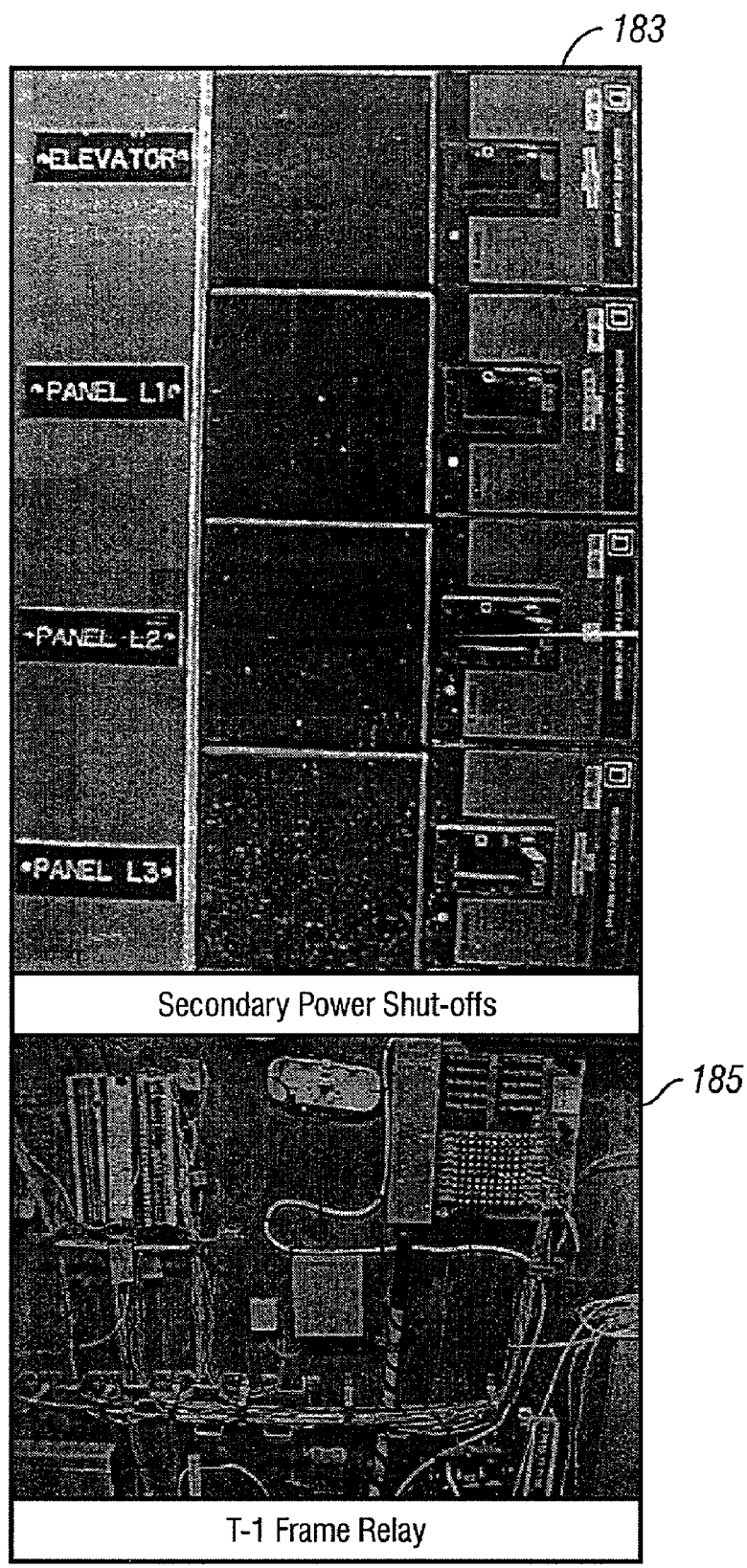
FIGS. 23A–F illustrate exemplary display windows that may be presented after a user has selected a "Total Main Electrical Shutoff Location" icon in the right most display window of FIG. 22, in accordance with one embodiment of the invention.
Figure 23B:
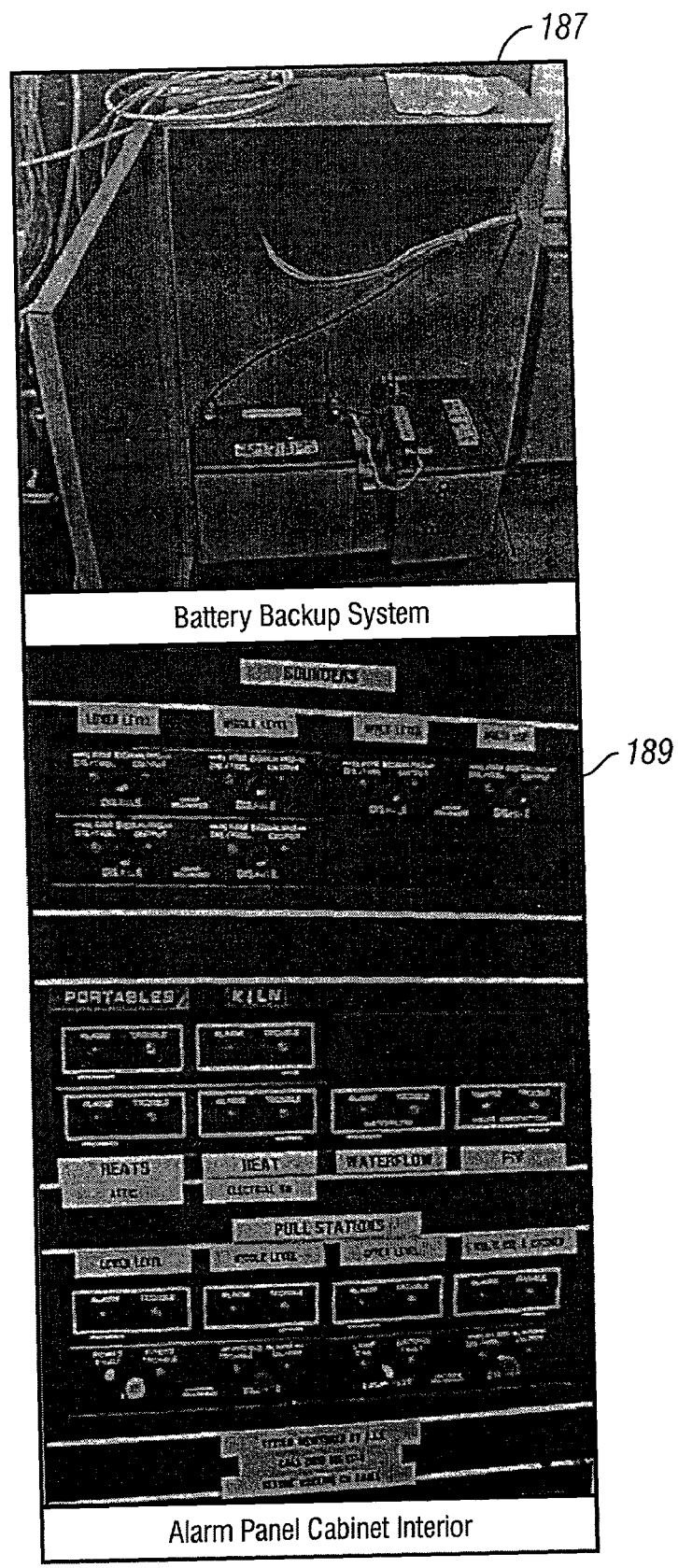
Figure 23C:
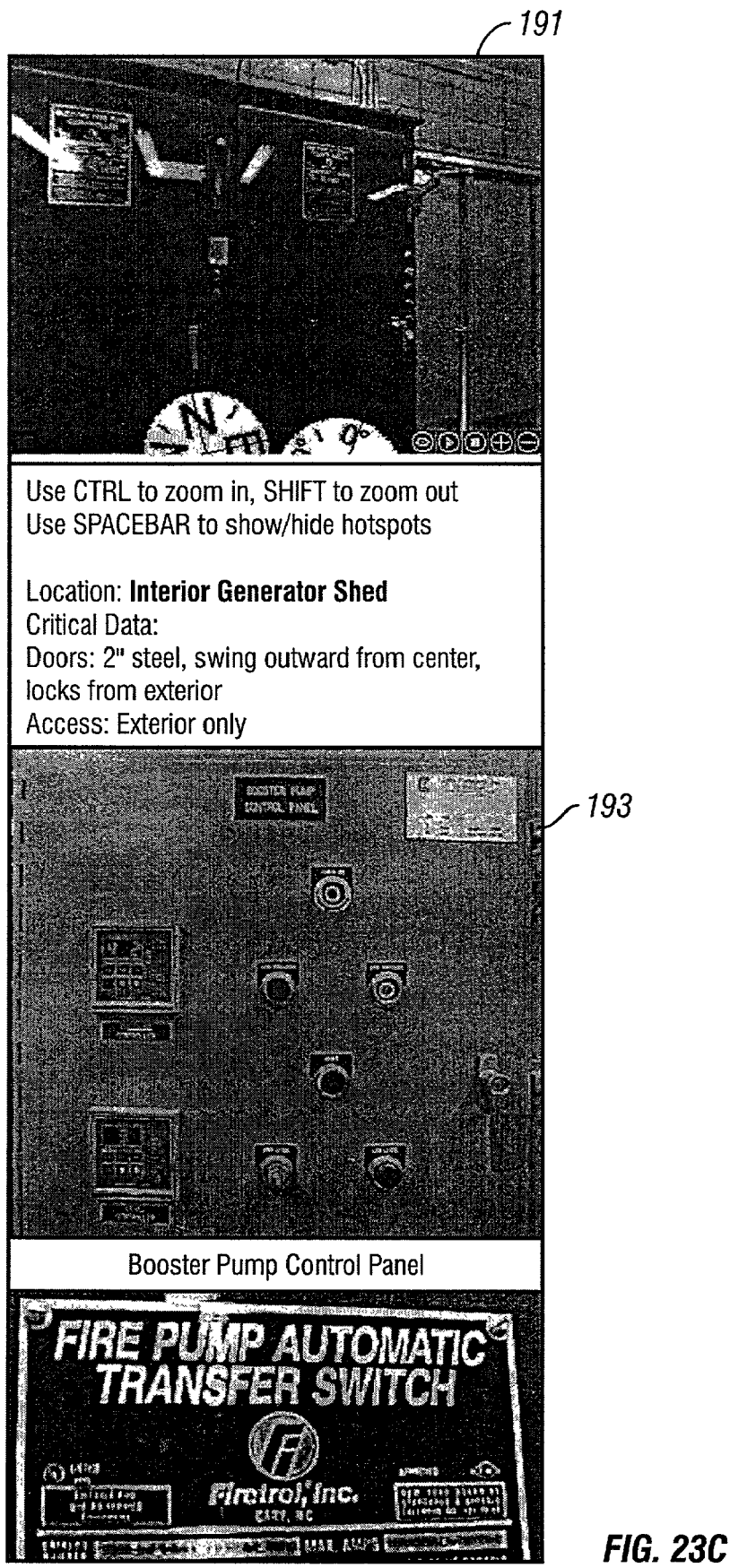
Figure 23D:
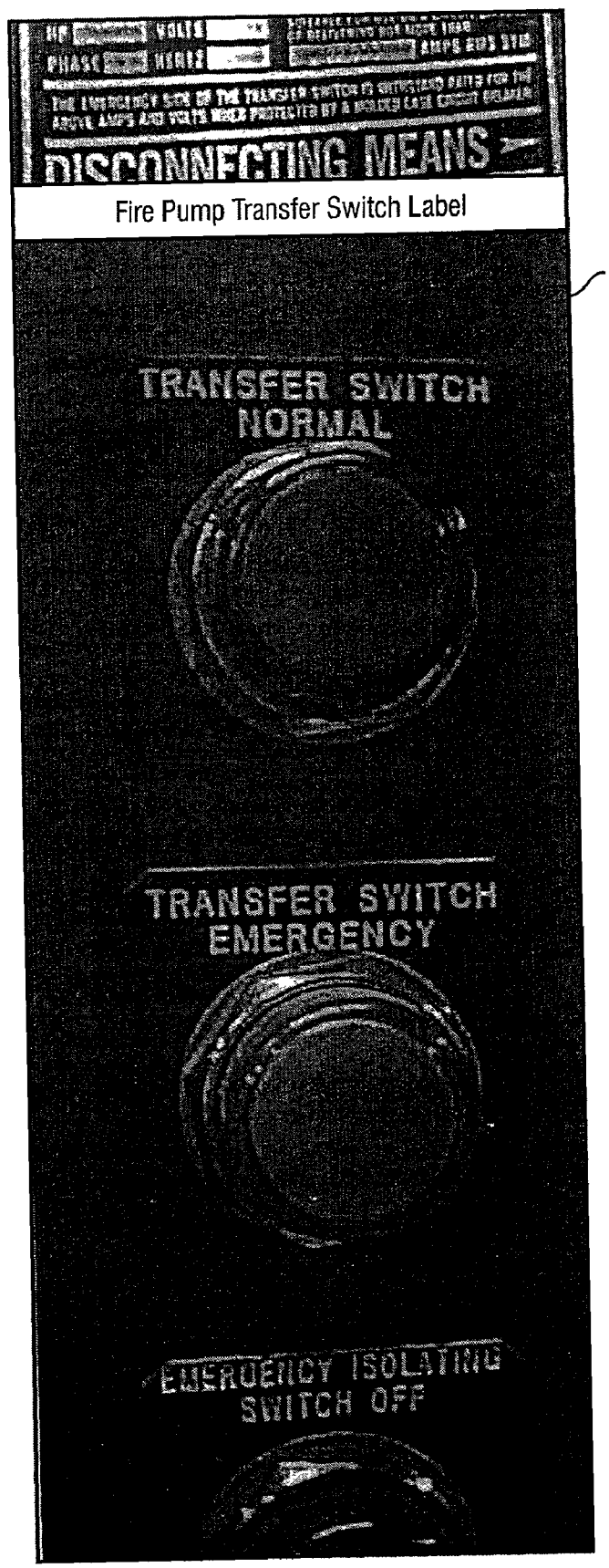
Figure 23E:
Figure 23F:
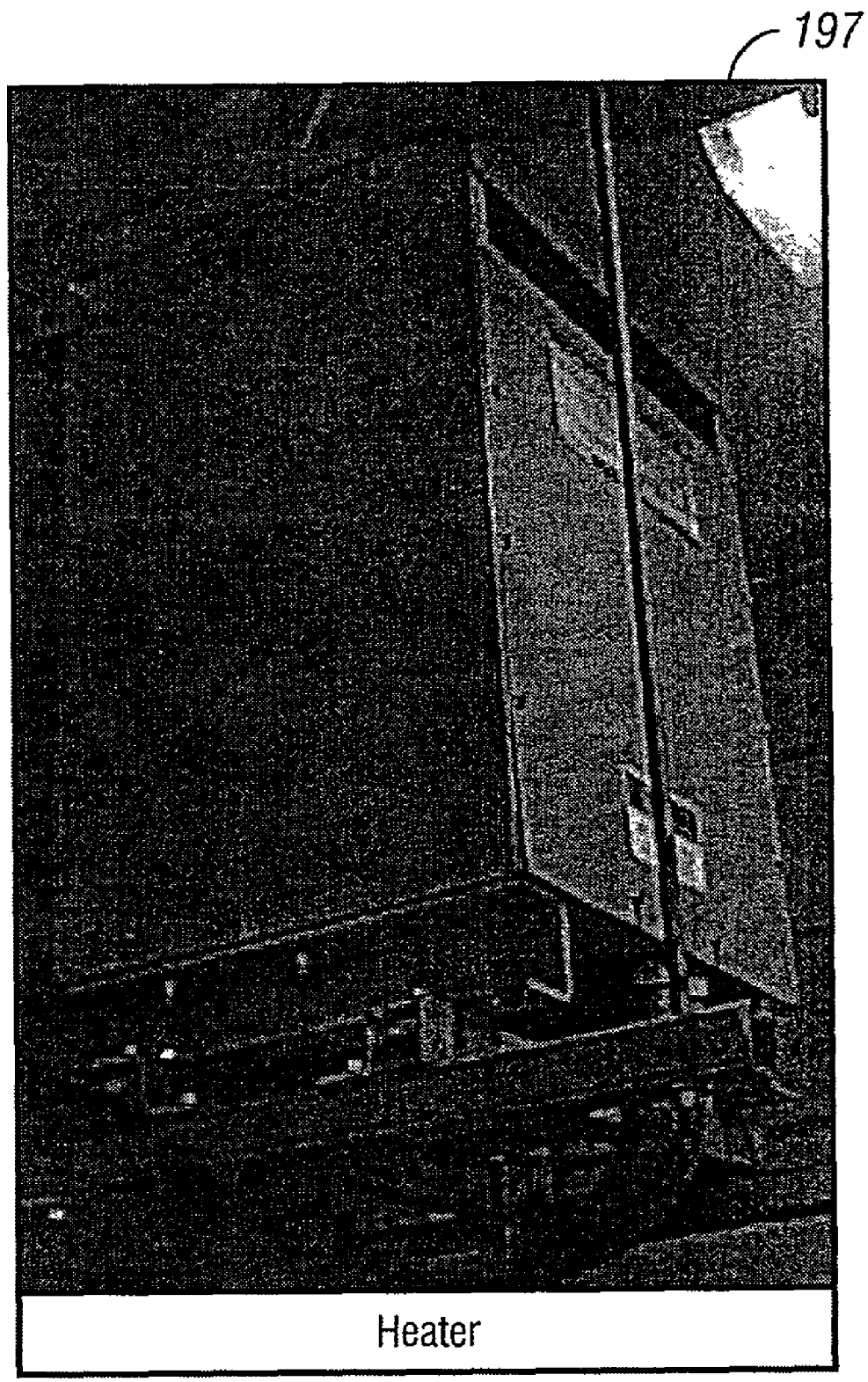

FIG. 17 illustrates an exemplary list 169 that is displayed in a right window of a computer screen display when an "Administrative Personnel" link is selected from the index 165. FIGS. 18 and 19 illustrate exemplary lists 171 and 173 that are displayed when "Alarm Company Information" and "Communications Information" is selected from the index 165, respectively. FIGS. 20 and 21 illustrate exemplary lists 175 and 177 that are displayed when "Building Construction" and "Emergency Utility Shut-Offs" items are selected from the index 165, respectively.

Figure 22:
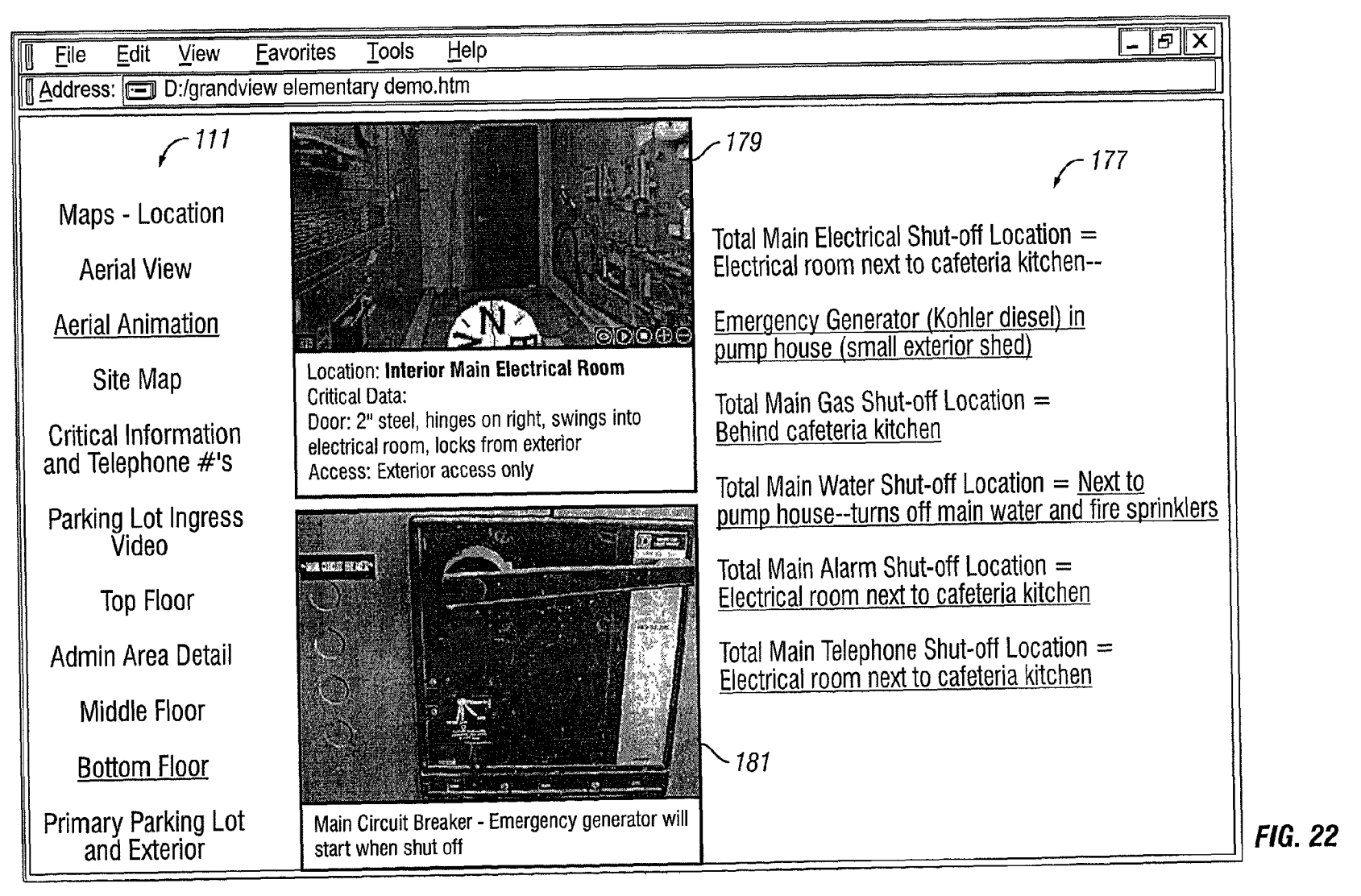

As shown in FIG. 21, the window that displays "Emergency Utility Shut-Off" information further includes links to access additional information. For example, under the first listing of information for "Total Main Electrical Shutoff Location," there is a link, indicated by underlined text, to the "Electrical room next to cafeteria kitchen." By clicking on this link, the user is provided a spherical image 179, in the middle window, of this electrical room, as shown in FIG. 22. FIG. 22 also illustrates an image 181 of a main circuit breaker that is located in the electrical room that is also provided to the user. By scrolling down the image in the middle window, additional critical information may be viewed. FIGS. 23A–F illustrate further images of secondary shutoffs 183, T-1 frame relay circuitry 185, a battery backup system 187, an alarm panel cabinet interior 189, an interior generator shed 191, a booster pump control panel 193, a fire pump transfer switch 195, and a heater 197 that may be of interest to emergency personnel.

Figure 24A:
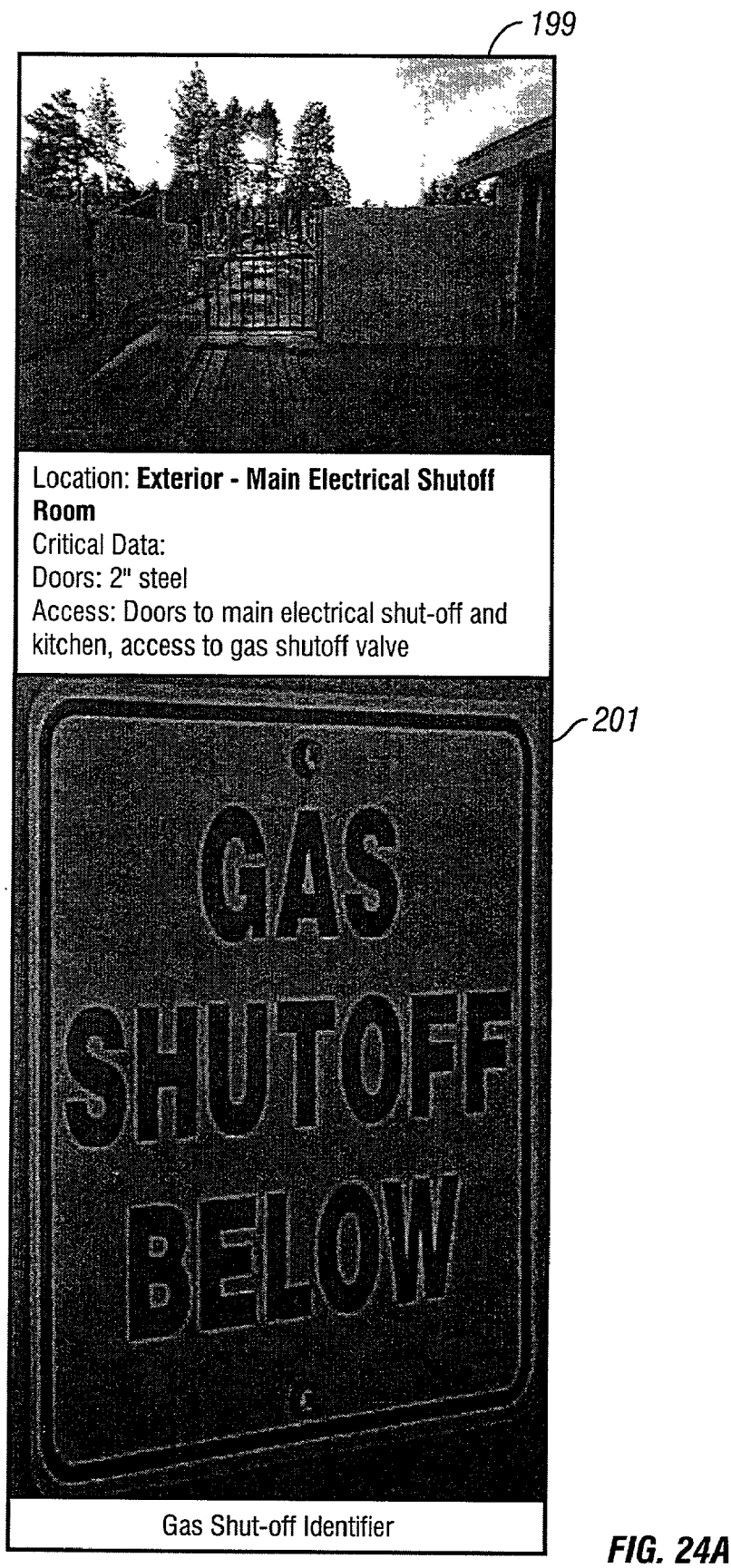
FIGS. 24A and B illustrate exemplary display windows that may be presented after a user has selected a "Total Main Gas Shutoff Location" icon in the right most display window of FIG. 22, in accordance with one embodiment of the invention.
Figure 24B:
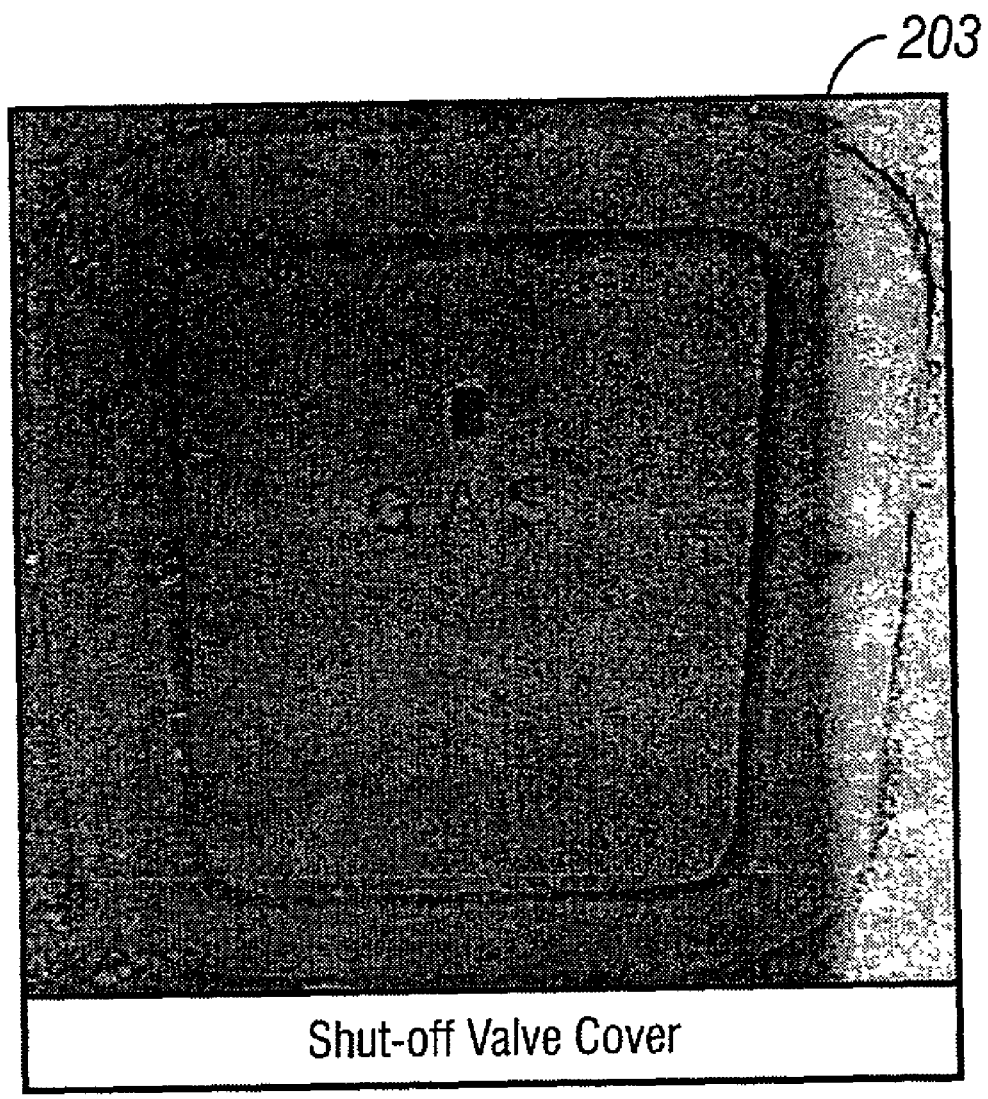

Referring again to FIG. 21, if the user desires further information regarding the gas shutoff location, he or she may select the link under "Total Main Gas Shutoff Location=Behind cafeteria kitchen" in the window shown in FIG. 21. Upon doing so, the user will be presented with a window as illustrated in FIG. 24A. A top scene 199 of that window is a spherical image of the area outside of kitchen where the gas shut-off valve is located. As explained above, the user may navigate within this scene and view images of the surrounding area as if he or she is virtually present at that location. Under the spherical image 199, there are images 201 and 23 that provide further critical information as shown in FIG. 24B.

Appendix A attached hereto provides an overview of an exemplary process of conducting a tactical survey of a site in accordance with the preferred embodiments of the invention described above.

The invention provides a method and system for quickly and easily providing critical tactical information to emergency personnel during crisis situations. As described above, a large amount and variety of information may be efficiently delivered to emergency personnel to address a multitude of tactical concerns and issues. Such a comprehensive and user friendly system has heretofore been unknown to assist emergency personnel in crisis situations. One of ordinary skill in the art will appreciate that the above descriptions of the preferred embodiments are exemplary only and that the invention may be practiced with modifications or variations of the techniques disclosed above. Those of ordinary skill in the art will know, or be able to ascertain using no more than routine experimentation, many equivalents to the specific embodiments of the invention described herein. Such modifications, variations and equivalents are contemplated to be within the spirit and scope of the present invention as set forth in the claims below.

APPENDIX A

Procedure for Tactical of a Site

An exemplary procedure for gathering the information and data necessary to implement the functions discussed above is described below, in accordance with a preferred embodiment of the invention. The description below is provided in the context of gathering information pertaining to a school. However, it is understood, that for other types of sites, various methods and techniques for gathering, storing and formatting the information for presentation may be utilized and would be readily apparent to those of skill in the art.

As an initial step, it is desirable to send a pre-survey packet to appropiate school personnel (e.g., Principal, Vice Principal, etc.) referred to herein as the "site administrator." The pre-survey packet is an information-gathering tool designed to increase awareness and prepare school personnel for the arrival of the survey team. The pre-survey packet generally describes the process of surveying the site and gathering the necessary information, data photos, images, videos, etc. Upon receipt of this packet the site adminidtrator will review the "orientation" information, answer some preliminary questions and acquire requested information. The site administrator will then forward the completed pre-survey packet to the survey team or survey company (e.g., Tactical Survey Group, Inc. located at Creastline, Calif., U.S.A.). This packet is then used by the survey company to conduct a tactical site survey.

The day of the on-site survey and photo shoot, the survey team meets with the site administrator. Team members perform an exterior and interior site review. The survey team then agrees upon a start point and survey plan to ensure complete coverage of the facility.

Hard copy reports of the completed pre-survey packet have been provided to each team member. Camera equipment is then assembled. Two photographs are taken which are hemispheric views each comprising a horizontal field of view of 185° and a vertical field of view of 185°. The sphere location is then marked on the map provided by the facility. In another embodiment, to produce a spherical images may be porduced by taking multiple rows of photographs in a circumferential fashion, utilizing conventioal or wide-angle formats. For example, a first row of photographs may be taken where the center of each image is 30 degrees above a horizontal plane. A second row of photographs is then taken where the center of the images are 30 degrees below horizontal plane. The angle of the photographs taken would depend on the types of lense(s) used and image format. These multiple rows are then seamed together using known techniques to provide a spherical image of an area or room being surveyed. The information is then documented on a Data Collection Worksheet (DCW).

Identification of any area or object within that image sphere which would be better served by still photographs is annotated. Appropriate still photos are captured on a digital camera for processing and noted in the DCW. Visual and physical inspections of all areas within the spherical photographs are correlated with the map provided by facility. Alterations of corrections to the map are made as required. All pertinent tactical informatiom is documented in the DCW. Links to and from the current sphere to the next sphere are documented using a spherical locator number.

Upon completion of interior and exterior evalution the team compiles a compact disk and a physical (photographic) rendering of all documented information as detailed in the Post Survey Procdures.

Exemplary acts for creating, formatting, layering and linking images and maps, in accordance with preferred embodiments of the invention, are now described below. In a preferred embodiment, commericially available software programs such as Adobe Photoshop™, Adobe Image Ready™ and Adobe Illustrator™ are utilized to perform some of all of the acts described below.

Post Survey Procedures

The following describes exemplary acts to create and format images and information for display in accordance with an embodiment of the invention.

Download original images to computer.
Write original images to a CD for protection.
Transcribe voice recording from field tactical survey team.
Compile and seam image hemispheres using known spherical imaging
technologies.
Embed spherical image file into HTML page.
Embed related still photography into HTML page.
Embed relevant "Critical Data" and "Tactical Information" into HTML page using transcribed data collection from tactical survey.
Identify "Link-to" and "Link-from" locations.
Embed tool-tip "Critical Information" locations.
Create digitial map of subject area using "Adobe Photoshop". See "Procedures for Making a Map".
Identify photographic locations on maps (Paper/Digital).
Place Graphic Representations of photographic locations on digital map "Adobe Photoshop".
Create "mouse over" layering on digital map (3+layers) per location. See "Procedures for layering".
Create image slices with "Adobe Image Ready". See "Prodedures for Slicing".
Create image slice layer parameters with "Adobe Image Ready".
Create image slice URL links.
Create image slice target frame designations.
Layout and create overall HTML application.
Test application for accuracy.
Review application with client to identify any modifications or corrections.
Return product to client, obtain signed acceptance.

Procedures for Making a Map

The following describes exemplary acts to create and format inages and maps for display in accordance with an embodiment of the invention.

Scan image to Photoshop (file>import>scanner)
Invert colors if necessary (should have black background) (images>adjust>invert)
Make new layer named "overlay"
Use Crop Tool to cut out unnecessary background
Resize image (W=320 constraints proportion x)
Select Rectangle Tool (solid) select create new work path option, (to trace around outline of rooms, halls, stairs, etc. with appropriate line thickness and color)
Select Pen Tool, select create new work path option (to trace around outline of rooms, halls, stairs, etc. with appropiate line thicknesses and color)
After drawin paths using above tools, right click on path, choose option stroke path, use paintbrush tool (having selected appropriate line thickness and color in the paintbrush options) ** Hold down Shift to constrain lines to 45 degree multiples (pen tool)

Once map has been traced, you may hide the background layer (containing the original map) or erase it using the Erase Tool.

Select the Text Tool and an appropriate font and size; you can begin naming the rooms. Make sure that each name goes onto a separate text layer.

Mames can be drawn outside of the rooms, and then the Line Tool can be used to make arrows correcting them.

Name all rooms using above steps.

(The next step is to insert dots identifying image shot locations)

Create a new layer called "DOTS".

Select the Pencil or Paintbrush Tool and a brush, draw dots of appropriate size and color to identify photo shot locations (referencing survey map).

Procedure for Layering

The following describes exemplary acts to create and format inage layers in accordance with an embodiment of the invention.

Open Photoshop and select your location map
Open Layer Toolbox (if not already opened)
Select New Layer
Select Layer Properties
Insert "Name" over location (back, description, text, etc.)
Select rectangular or lasso Marquee Tool
Place over area desired and drag to encompass room or location desired
Select Paint Bucket
Select Color (mouse over color is always yellow)
Fill in box
Select New Layer
Select Layer Properties
Insert "Name"_over desc (description)
Select Text Tool
Select color, font, size (currently MSSan Serif, 3 pt., red, yellow or other)
Type description (e.g., Interior Room 100)
Center text with Move Tool
Select Layer containing Name text (name or # of room only, e.g., 100)
Duplicate layer from box
Rename layer to "name_over text"
Select Text Tool and change color to black (or other as designated)

Procedure for Layering Dots

The following describes exemplary acts to create links between images and information in accordance with an embodiment of the invention.

In Photoshop Select Create a New Layer (for each dot)
Name Layers(s) using an initial (e.g. Hallway=H, H1, H2, etc.) from far left of room or area to right and the _over suffix (H_over)
On the layer corresponding to the shot location, use the Pencil or Paintbrush Tool to create a larger dot of different color over the top of the existing dot.

Alternatively, in another embodiment, off-the-shelf software for image mapping called iPOD Pro Sensomap™ from Image Intelligence, Ltd., located at Herefordshire, United Kingdom, may be used.

Procedure for Slicing

The following describes expemplary acts for slicing images in accordance with an embodiment of the invention.

Switch to Image Ready on Toolbox (bottom item)
Select Slice Tool
Drag over room or area from above
Select Rollover tab
Select Create New Rollover State
Go back to normal
Deselect layers to be visible (e.g., text, desc, back)
Go back Overstate
Select layers to visible (e.g., text, desc, back)
Go to Slice Tab
In URL field type in html file name for sphereical image from survey data
In Target line enter name of target frame(e.g., main, main1, left, top, etc)
To preview and correct select the Internet Explorer icon Procedures for Slicing Dots The following describes exemplary acts for slicing dots in accordance with one embodiment of the invention.

Select Slice Tool
Drag box over dot left to right
Select Rollover tab
Select Create New Rollover State
Go back to normal
Deselect layer to be visible (e.g., rollover layer H1_over)
Go back to Over state
Select layer to be visible (e.g., rollover layer H1_over) containing the large dot corresponding to the shoot location.
In URL field type in html file name for spherical image from survey data
In Target line enter name of target frame (e.g., main, main1, left, top, etc)
To preview and correct select the Internet Explorer icon
Alternatively, in another embodiment, off-the-shelf software for image mapping called iPOP Pro Sensomap™ from Image Intelligence, Ltd., located at Herefordshire, United Kingdom, may be used.

Critical Information Types

The following provides exemplary types of critical information that may be collected by the survey team and provided to emergency personnel in accordance with preferred embodiments of the invention.

General Maps

General Maps showing the location of the school/site in question. This information is provided in the form of a "Thomas Brothers" style map or a "Fire Map" that is obtained from the locally responsible fire protection agency.

This information is provided to:

Assist personnel responding from outside the local area who might not be familar with the location.

Provide accurate maps of the local area surrounding the school/site for traffic control and contingency planning in the event a suspect would breach the perimeter and pose a threat to the surrounding community.

Aerial View

The aerial view is an option, based on the level of support given to TSG, Inc. by local agencies or the client's willingness to pay for a chartered service to capture the photography.

This information is provided to:
  Allow the responders to view the entire site and surrounding area in an efficient manner.
Site Map
  The Site Map is a line drawing depicting the structures and facilities at a given site in a general overview. Items such as school buildings, playgrounds, parking lots, portable classrooms, etc.
  This information is provided to give responders a layout for the site which would allow them to begin preparation/formulation of a tactical plan.
Critical Information and Telephone Numbers
  General Information
    Consists of, but is not limited to:
    Primary fire protection agency
    Grades served (ex. K–12)
    Student Population
    Handicapped/Special Needs classrooms
    Medical supplies/locations
    Main telephone number
    Physical Address
    Map Grid (if published, using locally available information)
    Cross Street(s)
    Latitude and Longitude: used for tactical air support and/or medical air support
    Landing Zone Information: Pre designated landing areas for medical evacuation and/or tactical air support(not included in the demo version)
  Administrative Personnel
    Titles and names of all on-campus administrative personnel with 24 hour ETA from home and work/home telephone numbers
    This information is provided because these are the first people that a respomder will need to locate and talk to during crisis; also, in the event that a barricaded suspect has taken some administrative staff as hostages, enable responders to locate the next-in-line person(s) to get information from.
    Titles and names of all off-campus administrative personnel with 24 hour ETA from home and work/home telephone numbers
    This information is provided in the event that some or all of the on-campus administrators are themselves hostages; provides for a second level of information sources for the responder, as well as a coordinated list of people to manage information that would be released to the general public during a crisis situation.
  Alarm Company Information
    24 hour direct access telephone numbers to alarm company(s) enabling law enforcement to work with these agencies to operate certain types of monitoring devices (such as audio monitoring) or to disable these systems in a rapid and timely fashion.
  Communications Information
    Public address system—location, access, shut-off information; includes the PA systems capability in each classroom.
    Telephone Access
      location of main telephone switchboard
      location of main telephone switchboard shut-off
      locatin of main PA control panel
      location of all telephones that can dial an outside line
      location and type of all telephone jacks
    Internet Access
      Type of internet access (dial-up, DSL, T-1, etc.)
      Location of all internet access points within the premises
      Location of internet access control point/shut-off
    Audio/Visual Systems
      Alarm company monitoring (yes/no)
      Type of monitoring available (audio/video/motion)
      Location of all monitoring zones/areas with type of monitoring available
      Location of all televisons
      Type of television connection (antenna,cable,satellite, etc.)
      Location of television connection shut-off(s)
      Location of mobile television carts
      Video Studio capabilities (tape, broadcast, LAN)
  Building Construction
    Exterior wall construction
    Roof composition
    Window composition
    Window Frame composition
    Window tinting/reflectivity
    Ceiling composition (suspended tile, acoustic tile, dry wall, etc.)
    Floor composition
    Exterior door composition and fire rating
    Interior door composition and fire rating
    Skylights, skylight access
    Crawl spaces above the ceiling and/or below the floor
    Interior connecting hallways
    Rooms with folding walls
    Location of building blue prints(on or off campus)
  Emergency Utility Shut-Offs
    Total main electrical shut-off
    Total main gas shut-off
    Total main water shut-off
    Total main telephone shut-off
    Total main internet shut-off
    Total main public address system shut-off
    Total main alarm shut-off (fire, intruder, heat sensors, motion detectors, etc.)
    Total main cable TV shut-off
    Total main satellite TV shut-off
    Emergency generator/backup power locations(s)
    Fire pump locations/shut-off
    Portable water shut-off locations
  Major Hazmat Locations
    Laboratories (physics, chemistry, biology, etc.)
    Shop Locations (auto, metal, wood, etc.)
    Type and location of such hazardous materials as: gaseous, aerosols, liquids
    Federal Material Safety Data Sheets for all Hazmat substances normally kept on location
Structure Maps
  Field-verified Line drawings of each floor of each structure, which ar "clickable" to display a fully spherical image of all rooms, janitors closets, crawl spaces, utility decks, points of ingress/egress, exterior locations (for tactical planning and snipers information)
  Maps remain visible at all times during the information display, enabling the end-user to rapidly navigate the structure's interior of exterior
  Maps are labeled with room numbers and major location data Where necessary for clarity, large scale detail maps are provided, which can be navigated in the same manner as stated above.

Links to all floors, exterior areas, and emergency utility shut-off data are displayed at the bottom of each map for rapid navigation, and remain visible at all times during map/information display Aerial Animation The aerial animation is an option, based on the level of support given to TSG, Inc. by local agencies or the client's willingness to pay for a charted service to capture the photography.

This information is provided to:

Allow the responders to view the entire site and surrounding area in an efficient manner from an unobstructed aerial viewpoint Ingress Video A "Through-the-windshield" video view of each approach vector to the site, enabling the responder to identify the best and safest possible approach to the area in question; ex. Where to park, exposure to fire from within the structure during ingress, availability of safe cover when existing a vehicle, etc.

Primary and Secondary Emergency Operations Center(s)

School and/or emergency response agency provided identification of areas that would serve as emergency operations centers during a crisis situation (sometimes called Incident Command Posts) not included in the demo version.

Cris Operations Protocols/Procedures

School and/or emergency response agency provided protocols and/or procedures to be used during and after a crisis event.

May include, but is not limited to:
Radio frequencies
Fire protection staging areas
Medical Aid staging areas
Triage areas
Victim transport and Triage protocols
Disaster social services staging areas
Parent recovery areas
Information dissemination areas/public information officers
Traffic control

What is claimed is:

1. In a computer system having a graphical user interface including a computer screen display and a selection device, a method of providing tactical information pertaining to a site, the method comprising:

providing a first window on said computer screen display, said first window displaying a menu of user-selectable categories of tactical information;

receiving a user selection of one of said categories of information;

retrieving tactical information corresponding to said selected category, wherein said tactical information is retrieved from a computer readable medium; and providing a second window on said computer screen display, said second window displaying said retrieved tactical information corresponding to said selected category, wherein said second window further displays at least one first user-selectable item; and providing a third window on said computer screen display for displaying tactical information corresponding to said at least one first user-selectable item when said at least one first user-selectable item is selected, wherein said third window further displays at least one second user-selectable item that when selected displays corresponding information onto said second window, and wherein said first, second and third windows are displayed simultaneously on said computer screen display.

2. The method of claim 1 wherein said tactical information corresponding to said first user-selectable item comprises layout diagram of a floor of a building located on said site, said layout diagram illustrating the location and layout of a plurality of rooms on said floor, and wherein said method further comprises:

providing a plurality of links in said layout diagram, wherein each link corresponds to one of said plurality of rooms;

detecting when a user has selected one of said plurality of links; and displaying in said second window an image of one of said plurality of rooms corresponding to said selected link.

3. The method of claim 2 wherein said image comprises a 360-degree spherical image stored in said computer-readable medium, wherein said user may navigate in said image, to obtain different perspectives of said one of said plurality of rooms corresponding to said selected link, by using a cursor of said selection device to select a desired navigational direction.

4. The method of claim 3 wherein said spherical image further comprises at least one embedded pop-up message, wherein, when said cursor is positioned on an object within said image, said pop-up message appears in said third window so as to provide further information pertaining to said object.

5. The method of claim 2 wherein said second window further comprises a sub-window for displaying further information pertaining to said one of said plurality of rooms corresponding to said selected link.

6. The method of claim 1 wherein:
said menu of user-selectable categories of tactical information comprises a map category; and
said second window displays at least one map illustrating a geographic location of said site when said map category is selected by said user.

7. The method of claim 1 wherein:
said menu of user-selectable categories of tactical information comprises an aerial view category; and
said second window displays an aerial view of said site when said aerial view category is selected by said user.

8. The method of claim 1 wherein:
said menu of user-selectable categories of tactical information comprises an aerial animation category; and
said second window displays an aerial animation of said site when said aerial animation category is selected by said user.

9. The method of claim 1 wherein:
said menu of user-selectable categories of tactical information comprises a site map category; and
said second window displays a site map of said site when said site map category is selected by said user.

10. The method of claim 1 wherein:
said menu of user-selectable categories of tactical information comprises an ingress video category; and
said second window displays an ingress video illustrating an ingress route to said site when said ingress video category is selected by said user.

11. The method of claim 1 further comprising:
providing a third window on said computer screen display, wherein said menu of user-selectable categories of tactical information comprises a critical information category and said second window displays a plurality of critical information subcategories upon selection of said critical information category from said menu;

receiving a user selection of one of said plurality of critical information subcategories; and displaying information corresponding to said selected critical information subcategory in said third window.

12. The method of claim 11 wherein said critical information subcategories comprise administrative personnel contact information and emergency utility shut-off information.

13. The method of claim 12 further comprising:

detecting when said emergency utility shut-off information category is selected from said second window;

providing, in said third window, utility shut-off information pertaining to said site and at least one link corresponding to a utility shut-off mechanism when said emergency utility shut-off information subcategory is selected from said second window;

detecting when said at least one link is selected by a user; and displaying, in said second window, an image of said utility shut-off mechanism when said at least one link is selected by said user.

14. A system for providing tactical information pertaining to a site, comprising:

means for providing a first window on a computer screen display, said first window displaying a menu of user-selectable categories of tactical information;

means for receiving a user selection of one of said categories of information;

means for retrieving tactical information corresponding to said selected category, wherein said tactical information is retrieved from a computer readable medium; and means for providing a second window on said computer screen display, said second window displaying said retrieved tactical information corresponding to said selected category, wherein said second window further displays at least one first user-selectable item; and means for providing a third window on said computer screen display for displaying tactical information corresponding to said at least one first user-selectable item when said at least one first user-selectable item is selected, wherein said third window further displays at least one second user-selectable item that when selected displays corresponding information onto said second window, and wherein said first, second and third windows are displayed simultaneously on said computer screen display.

15. The system of claim 14 wherein said tactical information corresponding to said first user-selectable item comprises a layout diagram of a floor of a building located on said site, said layout diagram illustrating the location and layout of a plurality of rooms on said floor, and wherein said method further comprises:

means for providing a plurality of links in said layout diagram, wherein each link corresponds to one of said plurality of rooms;

means for detecting when a user has selected one of said plurality of links; and means for displaying in said second window an image of one of said plurality of rooms corresponding to said selected link.

16. The system of claim 15 wherein said image comprises a 360-degree spherical image stored in said computer-readable medium, wherein said user may navigate in said image, to obtain different perspectives of said one of said plurality of rooms corresponding to said selected link, by using a cursor of a selection device to select a desired navigational direction.

17. The system of claim 16 wherein said spherical image further comprises at least one embedded pop-up message, wherein, when said cursor is positioned on an object within said image, said pop-up message appears in said third window so as to provide further information pertaining to said object.

18. The system of claim 15 wherein said second window further comprises a sub-window for displaying further information pertaining to said one of said plurality of rooms corresponding to said selected link.

19. The system of claim 14 wherein:

said menu of user-selectable categories of tactical information comprises a map category; and said second window displays at least one map illustrating a geographic location of said site when said map category is selected by said user.

20. The system of claim 14 wherein:

said menu of user-selectable categories of tactical information comprises an aerial view category; and said second window displays an aerial view of said site when said aerial view category is selected by said user.

21. The system of claim 14 wherein:

said menu of user-selectable categories of tactical information comprises an aerial animation category; and said second window displays an aerial animation of said site when said aerial animation category is selected by said user.

22. The system of claim 14 wherein:

said menu of user-selectable categories of tactical information comprises a site map category; and said second window displays a site map of said site when said site map category is selected by said user.

23. The system of claim 14 wherein:

said menu of user-selectable categories of tactical information comprises an ingress video category; and said second window displays an ingress video illustrating an ingress route to said site when said ingress video category is selected by said user.

24. The system of claim 14 further comprising:

means for providing a third window on said computer screen display, wherein said menu of user-selectable categories of tactical information comprises a critical information category and said second window displays a plurality of critical information subcategories upon selection of said critical information category from said menu;

means for receiving a user selection of one of said plurality of critical information subcategories; and means for displaying information corresponding to said selected critical information subcategory in said third window.

25. The system of claim 24 wherein said critical information subcategories comprise administrative personnel contact information and emergency utility shut-off information.

26. The system of claim 25 further comprising:

means for detecting when said emergency utility shut-off information subcategory is selected from said second window;

means for providing, in said third window, utility shut-off information pertaining to said site and at least one link corresponding to a utility shut-off mechanism when said emergency utility shut-off information subcategory is selected from said second window;

means for detecting when said at least one link is selected by a user; and means for displaying, in said second window, an image of said utility shut-off mechanism when said at least one link is selected by said user.

27. A computer readable storage medium having computer-executable instructions that when executed by a computer system perform a method of providing tactical information pertaining to a site, the instructions comprising:

providing a first window on a computer screen display, said first window displaying a menu of user-selectable categories of tactical information;

receiving a user selection of one of said categories of information;

retrieving tactical information corresponding to said selected category, wherein said tactical information is retrieved from a computer readable medium; and providing a second window on said computer screen display, said second window displaying said retrieved tactical information corresponding to said selected category, wherein said second window further displays at least one first user-selectable item; and providing a third window on said computer screen display for displaying tactical information corresponding to said at least one first user-selectable item when said at least one first user-selectable item is selected, wherein said third window further displays at least one second user-selectable item that when selected displays corresponding information onto said second window, and wherein said first, second and third windows are displayed simultaneously on said computer screen display.

28. The computer readable medium of claim 27 wherein said tactical information corresponding to said first user-selectable item comprises a layout diagram of a floor of a building located on said site, said layout diagram illustrating the location and layout of a plurality of rooms on said floor, and wherein said instructions further comprise:

providing a plurality of links in said layout diagram, wherein each link corresponds to one of said plurality of rooms;

detecting when a user has selected one of said plurality of links; and displaying in said second window an image of one of said plurality of rooms corresponding to said selected link.

29. The computer-readable medium of claim 28 wherein said image comprises a 360-degree spherical image stored in said computer-readable medium, wherein said user may navigate in said image, to obtain different perspectives of said one of said plurality of rooms corresponding to said selected link, by using a cursor of a selection device to select a desired navigational direction.

30. The computer-readable medium of claim 29 wherein said spherical image further comprises at least one embedded pop-up message, wherein, when said cursor is positioned on an object within said image, said pop-up message appears in said third window so as to provide further information pertaining to said object.

31. The computer-readable medium of claim 28 wherein said second window further comprises a sub-window for displaying further information pertaining to said one of said plurality of rooms corresponding to said selected link.

32. The computer-reading medium of claim 27 wherein:

said menu of user-selectable categories of tactical information comprises a map category; and said second window displays at least one map illustrating a geographic location of said site when said map category is selected by said user.

33. The computer-readable medium of claim 27 wherein:

said menu of user-selectable catagories of tactical information comprises an aerial view catagory; and said second window displays an aerial view of said site when said aerial view category is selected by said user.

34. The computer-readable medium of claim 27 wherein:

said menu of user-selectable categories of tactical information comprises an aerial animation category; and said second window displays an aerial animation of said site when said aerial animation catagory is selected by said user.

35. The computer-readable medium of claim 27 wherein:

said menu of user-selectable categories of tactical information comprises a site map category; and said second window displays a site map of said site when said site map category is selected by said user.

36. The computer-readable medium of claim 27 wherein:

said menu of user-selectable categories of tactical information comprises an ingress video category; and said second window diaplays an ingress video illustrating an ingress route to said when said ingress video category is selected by said user.

37. The computer-readable medium of claim 27 wherein said instructions further comprises:

providing a third window on said computer screen display, wherein said menu of user-selectable categories of tactical information comprises a critical information category and said second window displays a plurality of critical information subcategories upon selection of said critical information category from said menu;

receiving a user selection of one of said plurality of critical information subcategories; and displaying information corresponding to said selected critical information subcategory in said third window.

38. The computer-readable medium of claim 37 wherein said critical information subcategories comprise administrative personnel contact information and emergency utility shut-off information.

39. The computer-readable medium of claim 38 wherein said instructions further comprises:

detecting when said emergency utility shut-off information category is selected from said second window;

providing, in said third window, utility shut off information pertaining to said site and at least one link corresponding to a utility shut-off mechanism when said emergency utility shut-off information subcategory is selected from said second window;

detecting when said at least one link is selected by a user; and displaying, in said second window, an image of said utility shut-off mechanism when said at least one link is selected by said user.

* * * * *